US012739749B2

(12) United States Patent
Fan

(10) Patent No.: US 12,739,749 B2
(45) Date of Patent: Sep. 15, 2026

(54) METHODS FOR CONTROLLING TERMINAL DEVICE AND TERMINAL DEVICE

(71) Applicant: GUANGDONG OPPO MOBILE TELECOMMUNICATIONS CORP., LTD., Dongguan (CN)

(72) Inventor: Jiangsheng Fan, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 342 days.

(21) Appl. No.: 18/406,326

(22) Filed: Jan. 8, 2024

(65) Prior Publication Data

US 2024/0155492 A1 May 9, 2024

Related U.S. Application Data

(63) Continuation of application No. PCT/CN2021/105820, filed on Jul. 12, 2021.

(51) Int. Cl.
*H04L 12/00* (2006.01)
*H04W 52/02* (2009.01)

(52) U.S. Cl.
CPC ... *H04W 52/0229* (2013.01); *H04W 52/0216* (2013.01)

(58) Field of Classification Search
CPC ......... H04W 52/0229; H04W 52/0235; H04W 76/28; H04W 76/50; H04W 76/27; H04W 52/0216; H04W 8/26; H04W 64/00; H04W 68/02; H04W 88/04; Y02D 30/70; H04L 5/0091
USPC ......................................................... 370/311
See application file for complete search history.

(56) References Cited

U.S. PATENT DOCUMENTS 10,225,703 B2 * 3/2019 Teruyama ............... H04W 4/80
2012/0084378 A1 * 4/2012 Kaneko ............... H04L 12/4035 709/208
2020/0413476 A1 12/2020 He
2021/0377852 A1 12/2021 Zhou et al.
(Continued)

FOREIGN PATENT DOCUMENTS

CN 102647527 A 8/2012
CN 103037482 A 4/2013
CN 103138959 A 6/2013
(Continued)

OTHER PUBLICATIONS

Du X et al., CN-109980661-A, Dual-Mode Communication Three-phase Comprehensive Load Unbalance Automatic Adjusting System, Has Passive Commutation Terminal For Realizing Commutation Operation Between Three Phases According To Passive Scheduling Instruction, 2019, 3 pages. (Year: 2019).*
(Continued)

*Primary Examiner* — Frantz Coby
(74) *Attorney, Agent, or Firm* — ASHURST PERKINS COIE US LLP

(57) ABSTRACT

The present application provides methods for controlling a terminal device and a terminal device. The method includes: a terminal device receiving a first message from a network device. The first message at least includes first configuration information for notifying the terminal device to enter a passive communication mode.

18 Claims, 6 Drawing Sheets

(56) References Cited

U.S. PATENT DOCUMENTS

| | | | |
|---|---|---|---|
| 2022/0264680 | A1 | 8/2022 | Kim et al. |
| 2023/0171690 | A1 | 6/2023 | Zhou et al. |

FOREIGN PATENT DOCUMENTS

| | | | |
|---|---|---|---|
| CN | 109936878 | A | 6/2019 |
| CN | 110784911 | A | 2/2020 |
| WO | 2021067444 | A2 | 4/2021 |
| WO | 2021092585 | A1 | 5/2021 |

OTHER PUBLICATIONS

International Search Report in the international application No. PCT/CN2021/105820, mailed on Mar. 28, 2022. 5 pages with English translation.

Written Opinion of the International Search Authority in the international application No. PCT/CN2021/105820, mailed on Mar. 28, 2022. 6 pages with English translation.

3GPP TS 38.331 V16.4.1 (Mar. 2021), 3rd Generation Partnership Project; Technical Specification Group Radio Access Network; NR; Radio Resource Control (RRC) protocol specification (Release 16). Chapter 4, 5 and 6. 946 pages.

Supplementary European Search Report in the European application No. 21949574.4, mailed on Aug. 7, 2024. 10 pages.

* cited by examiner

METHODS FOR CONTROLLING TERMINAL DEVICE AND TERMINAL DEVICE

CROSS-REFERENCE TO RELATED APPLICATION

This is a continuation of International Patent Application No. PCT/CN2021/105820, filed on Jul. 12, 2021, the disclosure of which is hereby incorporated by reference in its entirety.

BACKGROUND

At present, wireless communication systems, i.e., the first generation mobile communication (1G) system to the fifth generation (5G) mobile communication system, do not support terminal devices with a type of short-range communication, and cannot realize energy saving of the devices through a passive communication, which does not conform to a vision of Internet to Everything by the wireless communication systems, and is also brings inconvenient for users due to different devices using different communication systems.

SUMMARY

Embodiments of the present disclosure relate to the technical field of communications, and provide methods for controlling a terminal device and a terminal device.

In a first aspect, there is provided a method for controlling a terminal device in an embodiment of the present disclosure. The method includes that the terminal device receives a first message from a network device. The first message at least includes first configuration information for notifying the terminal device to enter a passive communication mode.

In a second aspect, there is provided a method for controlling a terminal device in an embodiment of the present disclosure. The method includes that the network device sends a first message to a terminal device. The first message at least includes first configuration information for notifying the terminal device to enter a passive communication mode.

In a third aspect, there is provided a terminal device in an embodiment of the present disclosure. The terminal device includes a memory for storing a computer program, a transceiver and a processor configured to invoke and run the computer program from the memory to control the transceiver to receive a first message from a network device. The first message at least comprises first configuration information for notifying the terminal device to enter a passive communication mode.

DETAILED DESCRIPTION

In order to make the objectives, technical solutions and advantages of the embodiments of the present disclosure clearer, technical solutions of the embodiments of the present disclosure will be clearly and completely described below in combination with the accompanying drawings of the embodiments of the present disclosure. It is apparent that the described embodiments are only part, rather than all, of the embodiments of the present disclosure. Based on the embodiments in the present disclosure, all other embodiments acquired by those skilled in the art without paying inventive effort shall fall within the scope of protection of the present disclosure.

The terms "first", "second", etc. in the specification and claims of the present disclosure and drawings are used for distinguishing similar objects and not necessarily for describing a specific sequence or sequential order. It is to be understood that data used in this way may be interchangeable under an appropriate circumstance, so that the embodiments of the present disclosure described herein are, for example, capable of being implemented in a sequence other than those illustrated or described herein.

The terms "including/comprising" and "having", as well as any variations thereof in the specification, claims and above drawings of embodiments of the present disclosure are intended to cover a non-exclusive inclusion, for example, a process, a method, a system, a product, or a device that includes a series of steps or units is not necessarily limited to contain those expressly listed steps or units, but may contain other steps or units not expressly listed or inherent to such process, method, system, product, or device.

In the description of the embodiments of the present disclosure, the term "correspondence" may mean that there is a direct correspondence or an indirect correspondence between two listed items, may also mean that there is an association relationship between the two listed items, and may also be a relationship of indicating and being indicated, configuring and being configured, etc.

In order to better understand the method for controlling a terminal device provided by the embodiment of the present disclosure, the communication system architecture in the embodiments of the present disclosure is described below.

Figure 1:
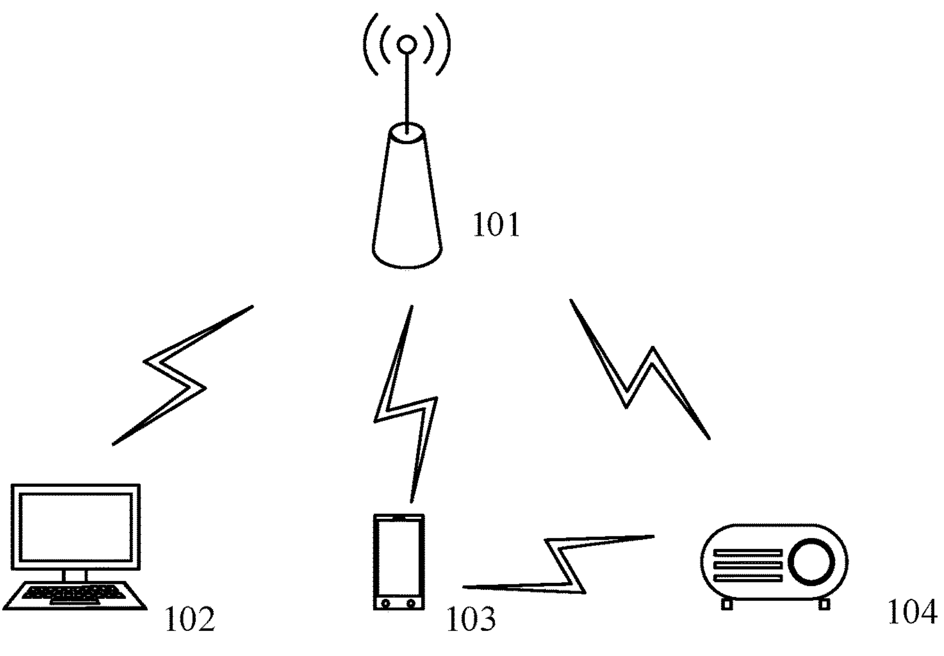
FIG. 1 is a diagram of an architecture of a communication system according to an embodiment of the present disclosure.

FIG. 1 is a diagram of an architecture of a communication system according to an embodiment of the present disclosure. As illustrated in FIG. 1, a communication system 100 includes a network device 101 and multiple terminal devices, such as, a terminal device 102 to a terminal device 104 in FIG. 1. The network device 101 communicates with the terminal device 102 to the terminal device 104 respectively. For example, the terminal device 104 may also communicate with the network device 101 through the terminal device 103.

The terminal device involved in the embodiments of the disclosure may also be referred to as a terminal, which may be a device with a wireless transceiver function. The terminal may be deployed on land, including indoor or outdoor, handheld or vehicle-mounted; or may be deployed on a water surface (such as a ship); or may be deployed in the air (such as an aircraft, a balloon, a satellite, or the like). The terminal device may be user equipment (UE). The UE may include a handheld device, a vehicle-mounted device, a wearable device or a computing device having a wireless communication function. Exemplarily, the UE may be a mobile phone, a tablet computer, or a computer with a wireless transceiver function. The terminal may also be a Virtual Reality (VR) terminal, an Augmented Reality (AR) terminal, a wireless terminal in industrial control, a wireless terminal in unmanned driving, a wireless terminal in telemedicine, a wireless terminal in a smart grid, a wireless terminal in a smart city, a wireless terminal in a smart home, etc. In the embodiments of the present disclosure, the device configured to realize the functions of the terminal may be a terminal, and may also be a device capable of supporting the terminal to realize the functions, such as a chip system, which may be installed in the terminal.

The network device involved in the embodiments of the present disclosure includes an access network device or a core network device. The network device illustrated in FIG. 1 is the access network device such as a base station.

The access network device is an intervening device to enable a terminal to access a core network device in the wireless manner, and the access network device is mainly responsible for radio resource management, Quality of Service (QoS) management, data compression and data encryption on the air interface side. For example, the access network device may be a base station (NodeB), an evolved base station (eNodeB), a base station in a 5G mobile communication system or a new radio (NR) communication system, a base station in future mobile communication system, etc.

The core network device includes a User Plane Function (UPF) network element, an Access and Mobility Management Function (AMF) network element, a Session Management Function (SMF) network element, a Policy Control Function (PCF) network element, etc. The UPF network element is mainly responsible for the transmission of user data, and other network elements may be called as control plane function network elements, which are mainly responsible for identification, authentication, registration management, session management, mobility management and policy control, so as to ensure the reliable and stable transmission of the user data.

In the embodiments of the present disclosure, a device configured to implement the functions of the network device may be a network device or a device capable of supporting the network device to implement the functions, such as, a chip system, and the device may be installed in the network device.

The technical solution provided by the embodiments of the present disclosure may be applied to a Long Term Evolution (LTE) architecture, and may also be applied to a Universal Mobile Telecommunications System (UMTS) Terrestrial Radio Access Network (UTRAN) architecture, or Global System for Mobile Communication (GSM) system or Enhanced Data Rate for GSM Evolution (EDGE) Radio Access Network (GERAN) architecture. In addition, the technical solution provided by the embodiments of the present disclosure may also be applied to any other wireless communication system with similar structure and functions, such as a Public Land Mobile Network (PLMN) system, a 5G communication system or a communication system after the 5G, etc., which is not limited in the embodiments of the present disclosure.

The wireless communication between communication devices may include: a wireless communication between the network device and the terminal, a wireless communication between the network device and another network device, and a wireless communication between the terminal and another terminal. In the embodiments of the present disclosure, the term "wireless communication" may also be referred to as "communication" for short, and the term "communication" may also be described as "data transmission", "information transmission", or "transmission". Those skilled in the art will apply the technical solution provided by the embodiments of the present disclosure to the wireless communication between the network device and the terminal, such as a wireless communication between the access network device and the terminal, and a wireless communication between the core network device and the terminal.

In the communication between the terminal and the network, the terminal and the network will follow the principle of peer-to-peer protocol stack, i.e., each interface corresponds to a respective peer-to-peer protocol function. The peer-to-peer protocol stack in the 5G system is briefly introduced below.

Figure 2:
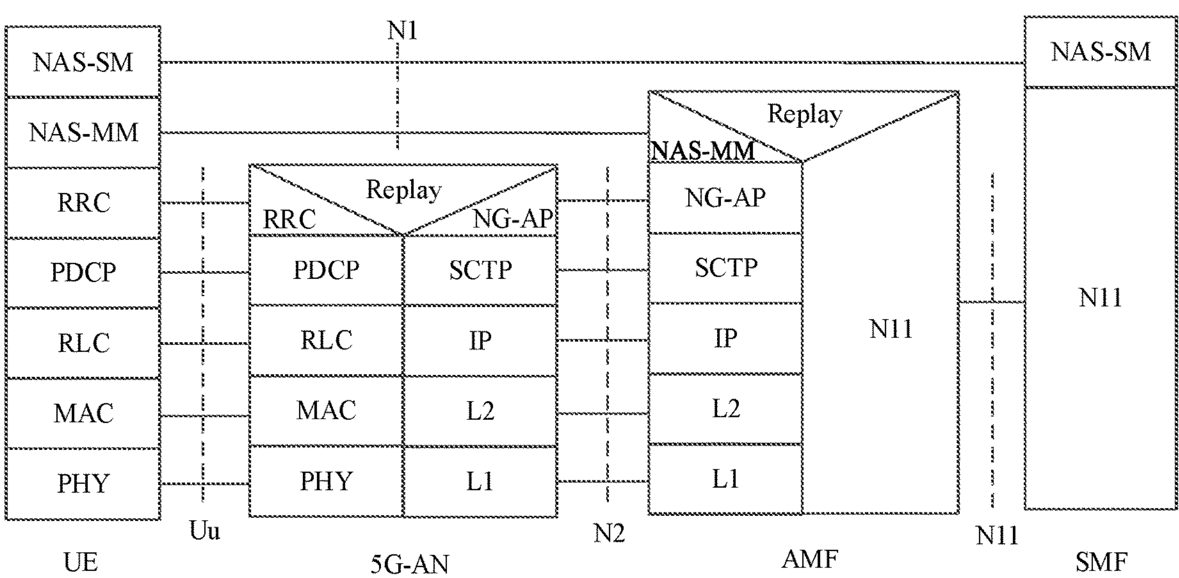
FIG. 2 is a schematic diagram of a peer-to-peer control plane protocol stack between a terminal and a core network.

FIG. 2 is a schematic diagram of a peer-to-peer control plane protocol stack between a terminal and a core network. As illustrated in FIG. 2, the control plane carries interactive signaling between the terminal and the network side. The data transfer on the control plane is implemented through Uu interface-N2 interface-N11 interface. The signaling between different network elements is implemented by applying the peer-to-peer protocol stack.

An access stratum (AS) of the terminal includes, from bottom to top, a physical (PHY) layer, a Media Access Control (MAC) layer, a Radio Link Control (RLC) layer, a Packet Data Convergence Protocol (PDCP) layer, and a Radio Resource Control (RRC) layer.

A non-access stratum (NAS) of the terminal device includes an NAS Mobile Management (NAS-MM) layer and an NAS Session Management (NAS-SM) layer. The NAS-SM and NAS-MM follow an NAS protocol of the N1 interface. The NAS-SM supports session management function between the terminal and the SMF network element, and the NAS-MM supports mobility management function between the terminal and the AMF network element, such as registration management, connection management, user plane connection activation and deactivation operation, etc.

With the continuous improvement of communication requirements, wireless communication networks need to deal with various emerging application scenarios, such as Enchanted Mobile Broadbrand (eMBB), Ultra-Reliable Low Latency Communication (URLLC), massive Machine Type of Communication (mMTC) and so on.

The eMBB aims at users' access to multimedia content, services and data, the demand of eMBB is growing rapidly. Since the eMBB may be deployed in different scenarios, such as at indoor, urban and rural areas, and the capabilities and the demand of eMBB are quite different in different scenarios, it cannot be generalized and must be analyzed in detail in combination with specific deployment scenarios. Typical applications of the URLLC include industrial automation, power automation, telemedicine operation (surgery), traffic safety and so on. The typical characteristics of mMTC include high connection density, small data volume, delay-insensitive services, low cost and long service life of modules and so on.

In the 5G network environment, a new RRC state, i.e., the RRC inactive state ((i.e., RRC INACTIVE), is defined for the purpose of reducing air interface signaling, quickly restoring wireless connection and quickly restoring data traffic. The new RRC state is different from the RRC idle state (i.e., RRC IDLE) and the RRC connected state ((i.e., RRC CONNECTED).

For the RRC IDLE, mobility is UE-based cell selection/cell reselection, paging is initiated by a Core Network (CN), a paging area is configured by the CN, and UE AS context and RRC connection do not exist at the base station side.

For the RRC CONNECTED, an RRC connection exists, the base station and UE have the UE AS context, the network side knows the position of the UE at a level of a specific cell, the mobility is controlled by the network side, and unicast data may be transmitted between the UE and the base station.

For the RRC INACTIVE, the mobility is a UE-based cell selection/cell reselection, CN may connected to the Radio Access Network (RAN), an anchor base station has the UE AS context, the paging is triggered by the RAN, an RAN-based paging area is managed by the RAN, and network side knows the position of the UE at a level of an RAN-based paging area A beautiful vision that, "Information comes at will, and everything is within reach", is expected by the human society on the 5G. In the era of Internet to Everything, there are many challenges, including fusion of various communication modes, such as fusion of short-range communication and cellular communication.

Generally, the short-range communication is a communication within 100 m, and includes Wireless Fidelity, Zigbee, Bluetooth, Ultra-wideband (UWB), Radio Frequency Identification (RFI) and Near Field Communication (NFC) and so on. The common application scenarios of the short-range communication may include an identity (ID) card, a bank card, a access card, a commodity anti-theft magnetic stripe, etc. The biggest characteristic of the short-range communication is the low power consumption or zero power consumption, which provides data passively. The short-range communication penetrates all aspects of people's lives, and the application prospect of the short-range communication is worth expecting.

At present, the short-range communication system is independent of the cellular communication system. That is to say, existing wireless communication systems, i.e., the 1G system to 5G system, do not support terminal devices with a type of the short-range communication, which does not conform to the vision of the Internet to Everything in the wireless communication system. The inconvenience is brought to the users due to different devices applying different communication systems. In addition, the devices in existing wireless communication system have the requirement of realizing energy saving through passive communication, but the existing communication system does not support the application of this energy saving mode.

In consideration of the above problems, the embodiments of the present disclosure provide a method for controlling a terminal device, the method introduces a communication mode of the short-range communication device into the wireless communication system, thereby being beneficial to realizing the vision of the Internet to Everything in the wireless communication system and the energy saving control of the wireless communication device. The main idea of the technical solution of the present disclosure is described as follows. Because a characteristic of the short-range communication device is that the device does not actively send messages, which communicates passively, the inventor considers configuring a passive communication mode for the wireless communication device, so that the terminal device can flexibly activate or deactivate the passive communication mode and realize the purpose of energy saving.

Based on such consideration, the embodiments of the present disclosure describes an interaction process between the terminal device and the network device, and the interaction process mainly involves the configuration of the passive communication mode, indication of abilities associated with the passive communication mode, and the like. Specifically, the terminal device may activate or deactivate the passive communication mode based on a message associated with the passive communication mode sent by the network device; alternatively, the terminal device may activate or deactivate the passive communication mode by actively sending a message associated with the passive communication mode to the network device; alternatively, the terminal device may activate or deactivate the passive communication mode by sending a message associated with the passive communication mode to the network device through a relay device; alternatively, the terminal device may also activate or deactivate the passive communication mode by receiving, through the relay device, a message associated with the passive communication mode from the network device. The operation of activating the passive communication mode means entering the passive communication mode, and the operation of deactivating the passive communication mode means exiting the passive communication mode. The power consumption of the terminal device can be reduced through the above process, which is beneficial to realizing the vision of the Internet to Everything in the wireless communication system and improving comprehensive experience of users.

The technical solution in the present disclosure will be described in detail by specific embodiments. It should be noted that the following embodiments may be alone or combined with each other. For identical or similar contents, such as explanations of terms or nouns, explanations of operations and the like may be cross-referenced in different embodiments without repeating explanations.

Figure 3:
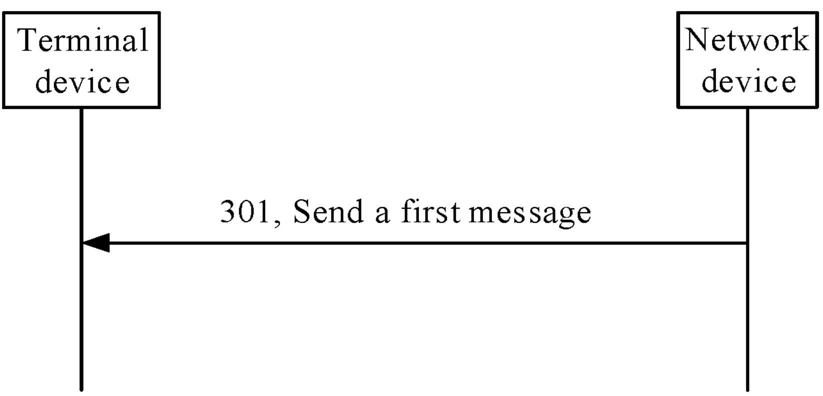
FIG. 3 is a first schematic diagram of interaction in a method for controlling a terminal device according to an embodiment of the present disclosure.

FIG. 3 is a first schematic diagram of interaction in a method for controlling a terminal device according to an embodiment of the present disclosure. As illustrated in FIG. 3, the method for controlling the terminal device includes an operation 301.

In the operation 301, a network device sends a first message to a terminal device.

In the embodiment, the first message at least includes first configuration information for notifying the terminal device to enter a passive communication mode.

Optionally, in some embodiments, the first configuration information is used for notifying the terminal device to enter a passive communication sub-mode. The passive communication sub-mode is any one of specific modes of the passive communication mode and associated with a specific task. Different passive communication sub-modes correspond to the same or different tasks.

The passive communication mode or the passive communication sub-mode has at least one of following characteristics.

1) The terminal device does not actively initiate a link set up process driven by a mobile originated (MO) signaling or MO data before exiting the passive communication mode.
2) The terminal device is in a low power consumption state, an ultra-low power consumption state or a zero power consumption state.
3) The terminal device does not perform any task other than a predefined task, corresponding to the passive communication mode, of the terminal device or a predefined task, corresponding to the passive communication sub-mode, of terminal device.
4) In response to the terminal device being in the passive communication mode and being ready to initiate an emergency service, the terminal device temporarily ignores a communication restriction of the passive communication mode or directly exits the passive communication mode, and then initiates the emergency service.

The predefined task, corresponding to the passive communication mode, of the terminal device or the predefined task, corresponding to the passive communication sub-mode, of the terminal device includes at least one of following tasks.

A paging monitoring task, a synchronization task, a positioning task, a system information acquisition task, a system information update task, a measurement task, a cell selection/reselection task or a network selection task.

Optionally, the first configuration information includes at least one of following information.

First indication information, resident frequency information, configuration information of a synchronization signal window corresponding to a resident frequency, subcarrier spacing information corresponding to the resident frequency, synchronization period information, configuration information of a special paging period, temporary identifier information of the terminal device, security configuration information, configuration information of a waiting duration for activating the passive communication mode, level identification information of the passive communication mode, configuration information of an event for the terminal device to exit the passive communication mode, and indication information of waiting for activating the passive communication mode.

The above information in the first configuration information is described in detail below.

1) The first indication information is for instructing the terminal device to enter the passive communication mode. The first indication information may be explicit configuration information sent by the network device, or implicitly expressed by other parameters.
2) The resident frequency information indicates frequency information to be monitored by the terminal device after the terminal device enters the passive communication mode.
3) The configuration information of the synchronization signal window indicates time position information of a synchronization signal corresponding to a frequency to be monitored by the terminal device after the terminal device enters the passive communication mode. The configuration of the synchronization signal window may include parameters such as a period of the synchronization signal occurring, a time-domain offset of a position of the synchronization signal in the period, and a duration of the synchronization signal in the period.
4) The synchronization period information indicates at least how often downlink signal synchronization is required after the terminal device enters the passive communication mode. The synchronization period information may be explicit configuration information sent by the network device, or whose corresponding performance requirements may be predefined in a protocol (which also called as a default mode configuration).
5) The configuration information of the special paging period indicates a period for the terminal device to receive a downlink paging after the terminal device enters the passive communication mode.
6) The temporary identifier information of the terminal device is used for determining whether the terminal device itself is paged when the terminal device monitors paging after entering the passive communication mode. The temporary identifier information of the terminal device may be an identifier defined by the AS or the NAS, and the identifier defined by the AS may be an identifier defined by a sub-layer contained in the AS.

Specifically, if the temporary identifier information of the terminal device is defined by a PHY layer, the temporary identifier information may be a special physical layer sequence, or the temporary identifier information may be carried by a Physical Downlink Control Channel (PDCCH) or a Physical Downlink Shared Channel (PDSCH).

7) The security configuration information is for performing security verification when the terminal device communicates with the network device. The security configuration information may only include an NAS security configuration, or only include an AS security configuration, or include both the NAS security configuration and the AS security configuration.
8) The configuration information of the waiting duration for activating the passive communication mode indicates a duration from a time when the terminal device receives the first configuration information to a time when the terminal device enters the passive communication mode, or indicates a duration from a time when the terminal device enters a radio resource control (RRC) idle state to the time when the terminal device enters the passive communication mode, or indicates a duration from a time when the terminal device enters an RRC inactive state to the time when the terminal device enters the passive communication mode.
9) The level identification information of the passive communication mode indicates a passive communication sub-mode, and each passive communication sub-mode corresponds to a respective predefined task of the terminal device. The passive communication sub-mode has an optional characteristic, and a task list corresponding to each passive communication sub-mode may be predefined by the protocol, as shown in Table 1.

TABLE 1

Relationship table between passive communication sub-modes and tasks

| Passive communication sub-mode 1 | Passive communication sub-mode 2 | . . . | Passive communication sub-mode N |
|---|---|---|---|
| associated task list 1 | associated task list 2 | . . . | associated task list N |

Where N is a positive integer greater than or equal to 1.

As shown in FIG. 1, taking each passive communication sub-mode associated with a respective one task list as an example, contents of the task lists associated with passive communication sub-modes may be the same or different. Each task list includes at least one of: a paging monitoring task, a synchronization task, a positioning task, a system information acquisition task, a system information update task, a measurement task, a cell selection/reselection task or a network selection task.

It should be noted that the embodiment of the present disclosure does not exclude a configuration mode that multiple passive communication sub-modes are associated with the same task list.

In the embodiment, the terminal device may enter a certain passive communication sub-mode by any one of the following two manners.

First Manner: An Explicit Configuration Manner.

The terminal device receives the explicit configuration from the network device. Specifically, the terminal device receives the level identification information of the passive communication mode from the network device, and after the terminal device receives the configuration from the network device, the terminal device enters a passive communication sub-mode corresponding to the configuration according to the requirements of the configuration.

It should be noted that in the level identification information of the passive communication mode, one bit may corresponding to one passive communication sub-mode, or a binary value corresponding to a bit combination composed of multiple bits corresponds to one passive communication sub-mode. For example, a bit combination composed of three bits can represent eight values, which is not limited by the embodiment of the present disclosure.

Second Manner: An Implicit Conversion Manner

After the terminal device enters the passive communication mode, the terminal device determines which passive communication sub-mode to enter according to events predefined by the protocol.

Exemplarily, the terminal device determines the passive communication sub-mode to enter according to a measurement result of a serving cell. Taking three passive communication sub-modes as an example, the terminal device enters a first passive communication sub-mode when the measurement result of the serving cell is greater than or equal to a first threshold; the terminal device enters a second passive communication sub-mode when the measurement result of the serving cell is less than the first threshold and greater than a second threshold; and the terminal device enters a third passive communication sub-mode when the measurement result of the serving cell is less than or equal to the second threshold.

Although the conversion events for the terminal device to enter the passive communication sub-mode are predefined by the protocol, parameters (e.g. the above-mentioned thresholds for the measurement events) associated with the conversion events may be configured by at least one of the following manners.

An NAS message, an AS message, or a default value.

The AS message may be a system broadcast message, a system multicast message, an RRC dedicated signaling, a PHY layer message or an MAC control message.

10) The configuration information of the event for the terminal device to exit the passive communication mode includes at least one of: an identifier of at least one event for exiting the passive communication mode, or a configuration parameter corresponding to each of the at least one event for exiting the passive communication mode.

In the embodiment, the event for exiting the passive communication mode includes at least one of following events.

First event: a timer T1 corresponding to configuration information of a duration of the passive communication mode is expired. The configuration information of the duration indicates a duration in which the terminal device remains in the passive communication mode after entering the passive communication mode.

Second event: a periodic timer T2 corresponding to configuration information of a periodic activation window of the passive communication mode is expired The configuration information of the periodic activation window is used for periodically activating the passive communication mode by the terminal device.

Third event: the passive communication mode operates up to a configured Coordinated Universal Time (UTC). The UTC indicates a moment up to which the terminal device remains in the passive communication mode after entering the passive communication mode.

Fourth event: a measurement result of a serving cell for the terminal device is lower than a first threshold.

Fifth event: the measurement result of the serving cell is lower than a second threshold for a first duration.

Sixth event: a distance between the terminal device and a position of a reference point is greater than a third threshold.

Seventh event: the distance between the terminal device and the position of the reference point is greater than a fourth threshold for a second duration.

The first to seventh events may be preconfigured by a protocol, and each event for exiting the passive communication mode corresponds to an event identifier. If only one event for exiting the passive communication mode is defined in the protocol, there may no level identification information of the passive communication mode.

Configuration parameters corresponding to events for exiting the passive communication mode may be determined based on the above several events for exiting the passive communication mode, as shown in Table 2.

TABLE 2

| | |
|---|---|
| First event | T1 |
| Second event | T2 |
| Third event | UTC |
| Fourth event | First threshold |
| Fifth event | Second threshold, first duration |
| Sixth event | Position of a reference point, third threshold |
| Seventh event | Position of a reference point, fourth threshold, second duration |

It should be noted that one or more of the position of the reference point, the T1, the T2, the UTC, the first threshold, the second threshold, the third threshold, the fourth threshold, the first duration or the second duration are configured by at least one of following manners.

An NAS message, an AS message, or a default value.

The AS message may be a system broadcast message, a system multicast message, an RRC dedicated signaling, a PHY layer message, or an MAC control message.

11) Indication information of waiting for activating the passive communication mode. The indication information of waiting for activating the passive communication mode indicates that the terminal device, after receiving the first message, stores configuration information contained in the first message and waits for a further activation indication message from the network device, instead of entering the passive communication mode immediately (this mode is also called a semi-static configuration).

The further activation indication message may be an NAS message or an AS message. The AS message may be a system broadcast message, a system multicast message, an RRC dedicated signaling, a PHY layer message, or an MAC control message.

In the embodiment, the first message may be an NAS message or an AS message. The AS message may be a system broadcast message, a system multicast message, an RRC dedicated signaling, a PHY layer message, or an MAC control message.

In the embodiment, the terminal device enters the passive communication mode according to the first message and communicates with the network device by adopting the passive communication mode.

The embodiments provide the method for controlling the terminal device. The terminal device receives the first message from the network device. The first message at least includes first configuration information for notifying the terminal device to enter the passive communication mode. The terminal device may communicate with the network device according to requirements of the passive communication mode. The terminal device enters the passive communication mode through configuration of a network side, in such mode, the power consumption of the device can be reduced and the purpose of energy saving can be achieved.

Optionally, in some embodiments, after the terminal device enters the passive communication mode, an inter-layer interaction process of the terminal device includes one of the following operations.

An AS of the terminal device notifies an NAS of the terminal device to enter the passive communication mode.

Alternatively, the NAS of the terminal device notifies the AS of the terminal device to enter the passive communication mode.

In this embodiment, if the AS of the terminal device firstly enters the passive communication mode, the AS of the terminal device further notifies the NAS of the terminal device to enter the passive communication mode through an inter-layer interaction message. Conversely, if the NAS of the terminal device firstly enters the passive communication mode, the NAS of the terminal device further notifies the AS of the terminal device to enter the passive communication mode through an inter-layer interactive message.

Through the inter-layer interaction process, consistency between states of the AS and the NAS of the terminal device can be maintained.

Optionally, in some embodiments, after the terminal device enters the passive communication mode, the method may include the following operation.

The terminal device exits the passive communication mode when a preset condition is satisfied. The preset condition includes at least one of following conditions.

First preset condition: the event (see the first event to seventh event abovementioned) for exiting the passive communication mode is triggered.

Second preset condition: second indication information is received from the network device.

Third preset condition: a lower layer of the terminal device receives third indication information from an upper layer of the terminal device.

Fourth preset condition: the upper layer of the terminal device receives fourth indication information from the lower layer of the terminal device.

Fifth preset condition: the terminal device is ready to initiate an emergency service.

The second indication information instructs the terminal device to exit the passive communication mode. The third indication information instructs the lower layer of the terminal device to exit the passive communication mode. The fourth indication information instructs the upper layer of the terminal device to exit the passive communication mode.

Optionally, the second indication information is carried by an NAS message or an AS message.

The AS message may be a system broadcast message, a system multicast message, an RRC dedicated signaling, a physical layer message or an MAC control message.

In the embodiment, the third indication information and the fourth indication information are inter-layer interaction indication information, the upper layer of the terminal device may be an application layer or the NAS, and the lower layer of the terminal device may be the NAS or the AS.

Exemplarily, the operation that the lower layer of the terminal device receives the third indication information from the upper layer of the terminal device includes following operations.

The NAS of the terminal device sends the third indication information to the AS of the terminal device; or the application layer of the terminal device sends the third indication information to the NAS of the terminal device; or the application layer of the terminal device sends the third indication information to the AS of the terminal device.

Exemplarily, the operation that the upper layer of the terminal device receives the fourth indication information from the lower layer of the terminal device includes following operation.

The AS of the terminal device sends the fourth indication information to the NAS of the terminal device; or the NAS of the terminal device sends the fourth indication information to the application layer of the terminal device; or the AS of the terminal device sends the fourth indication information to the application layer of the terminal device.

Optionally, in some embodiments, after the terminal device exits the passive communication mode, the inter-layer interaction process of the terminal device further includes one of following operations.

The AS of the terminal device notifies the NAS of the terminal device to exit the passive communication mode.

Alternatively, the NAS of the terminal device notifies the AS of the terminal device to exit the passive communication mode.

In the embodiment, if the AS of the terminal device firstly exits the passive communication mode (the reasons for exiting may be referenced with the first preset condition to the fifth condition), the AS of the terminal device further notifies the NAS of the terminal device to exit the passive communication mode through an inter-layer interaction message. Conversely, if the NAS of the terminal device firstly exits the passive communication mode, the NAS of the terminal device further notifies the AS of the terminal device to exit the passive communication mode through an inter-layer interaction message.

The consistency between states of the AS and the NAS of the terminal device can be maintained through the inter-layer interaction process.

As can be seen from the above embodiments, the terminal device may enter the passive communication mode according to the message sent by the network device, and may exit the passive communication mode according to the network configuration, network indication or situation of the terminal device itself. In addition, the terminal device may actively initiate a request for entering or exiting the passive communication mode, as described in the following embodiment.

Figure 4:
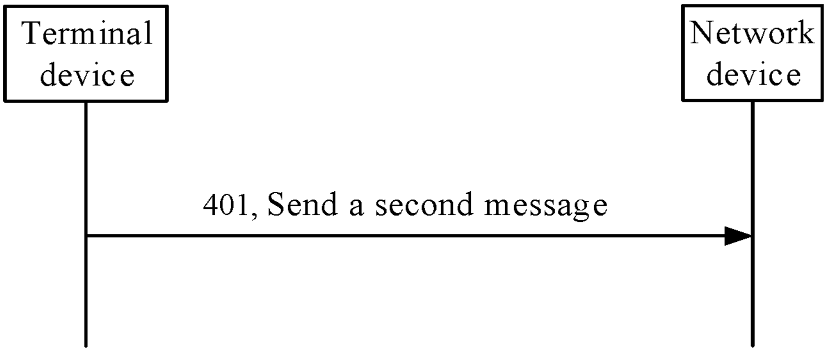
FIG. 4 is a second schematic diagram of interaction in a method for controlling a terminal device according to an embodiment of the present disclosure.

FIG. 4 is a second schematic diagram of interaction in a method for controlling a terminal device according to an embodiment of the present disclosure. As illustrated in FIG. 4, the method for controlling the terminal device provided by the embodiment includes operation 401.

In the operation 401, a terminal device sends a second message to a network device.

In the embodiment, the second message is used for the terminal device to request for entering or exiting the passive communication mode, or to request for modifying configuration information associated with the passive communication mode. The second message includes at least one of following configuration information.

First configuration: indication information for requesting for entering the passive communication mode.

Second configuration: indication information for requesting for exiting the passive communication mode.

Third configuration: a duration in which the terminal device expects to remain in the passive communication mode after entering the passive communication mode.

Fourth configuration: configuration information of a special paging period expected by the terminal device.

Fifth configuration: temporary identifier assistance information of the terminal device, for assisting the network device to generate a temporary identifier of the terminal device.

Sixth configuration: configuration information of a waiting duration for activating the passive communication mode expected by the terminal device. The waiting duration indicates a waiting duration required by the terminal device from preparing to enter the passive communication mode to actually entering the passive communication mode.

Seventh configuration: level identification information of the passive communication mode expected by the terminal device. The level identification information represents a passive communication sub-mode, and each passive communication sub-mode corresponds to a respective predefined task of the terminal device.

The above first and second configurations do not exist simultaneously, and only one piece of configuration information may appear for each request of the terminal device.

Both the first and second configurations have two configuration manners: an explicit configuration manner and an implicit configuration manner.

The explicit configuration manner for the first and second configuration is implemented by carrying explicit indication information in a message.

The implicit configuration manner of the first configuration is to implicitly indicate by whether there are other parameters associated with the passive communication mode. For example, only the third configuration is carried in the second message, which indicates that the terminal device is requesting for entering the passive communication mode and a duration in which the terminal device expects to remain in the passive communication mode after entering the passive communication mode simultaneously.

The implicit configuration manner of the second configuration is that, as long as there no first configuration and other parameters associated with the first configuration in the second message, it implicitly indicates that the terminal device expects to exit the passive communication mode.

The sixth configuration corresponds to the configuration information of the waiting duration for activating the passive communication mode in the above-mentioned embodiments. The seventh configuration corresponds to the level identification information of the passive communication mode in the above-mentioned embodiments. The information may refer to the above embodiments and will not be elaborated herein again.

In the embodiment, the second message is used for the terminal device to modify the configuration information associated with the passive communication mode, and may correspond to the above-mentioned third to seventh configurations.

The embodiment discloses a method for controlling a terminal device. The terminal device actively sends a second message to a network device according to its own situation, so as to flexibly activate or deactivate the passive communication mode, thereby reducing the power consumption of the terminal device and achieving the purpose of energy saving.

Optionally, in some embodiments, the terminal device sends the second message to the network device. If the second message is used for requesting for entering the passive communication mode, the communication may also performed through following operations.

The terminal device receives a first message from the network device. The first message at least includes the first configuration information for notifying the terminal device to enter the passive communication mode. The terminal device may communicate with the network device according to requirements of the passive communication mode. In the embodiment, the terminal device actively initiates to enter the passive communication mode, and may communicate with the network device by adopting the passive communication mode only after receiving the response message, i.e. the first message, from the network device.

In the embodiment, the second message may be an NAS message or an AS message. The AS message may be a system broadcast message, a system multicast message, an RRC dedicated signaling, a PHY layer message or an MAC control message.

Figure 5:
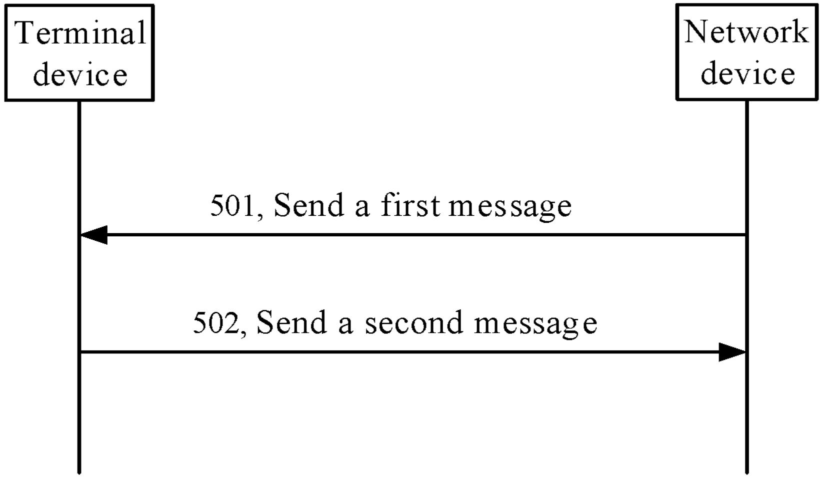
FIG. 5 is a third schematic diagram of interaction in a method for controlling a terminal device according to an embodiment of the present disclosure.

FIG. 5 is a third schematic diagram of interaction in a method for controlling a terminal device according to an embodiment of the present disclosure. As illustrated in FIG. 5, the method for controlling the terminal device provided by the embodiment includes operations 501 to 502.

In the operation 501, a network device sends a first message to a terminal device.

The first message at least includes first configuration information for notifying the terminal device to enter a passive communication mode.

In the operation 502, the terminal device sends a second message to the network device.

The second message is used for the terminal device to request for entering or exiting the passive communication mode, or to request for modifying configuration information associated with the passive communication mode.

Unlike the above embodiment, the terminal device sends the second message to the network device after receiving the first message from the network device.

In an application scenario of the present embodiment, the first message sent by the network device includes at least one piece of other information other than the first indication information in the first configuration information. Specifically, the first message carries configuration parameters associated with the passive communication mode, but does not instruct the terminal device to enter the passive communication mode. After the terminal device receives the first message, the terminal device may send the second message according to its own situation, and to request for entering the passive communication mode.

In another application scenario of the embodiment, the terminal device enters the passive communication mode after receiving the first message from the network device, however, the parameters contained in the first message do not meet the expectation of the terminal device, then the terminal device requests for updating the configuration parameters associated with the passive communication mode through the second message.

In another application scenario of the embodiment, the first message sent by the network device instructs the terminal device to enter the passive communication mode, and after a period of time, the terminal device may actively send the second message according to its own situation, to request for exiting the passive communication mode. Specifically, the terminal device may directly deactivate the passive communication mode after sending the second message. Optionally, the terminal device deactivates or remains in the passive communication mode according to the message responded by the network device after the terminal device sends the second message.

Figure 6:
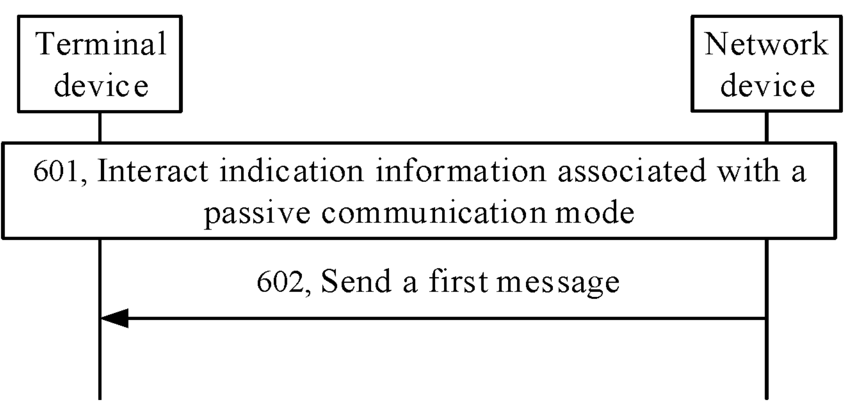
FIG. 6 is a fourth schematic diagram of interaction in a method for controlling a terminal device according to an embodiment of the present disclosure.

FIG. 6 is a fourth schematic diagram of interaction in a method for controlling a terminal device according to an embodiment of the present disclosure. Based on the embodiment illustrated in FIG. 3, as illustrated in FIG. 6, the method for controlling a terminal device provided by the embodiment includes operations 601 to 602.

In the operation 601, indication information associated with a passive communication mode is interacted between a network device and a terminal device.

In this embodiment, the operation 601 specifically includes following two operations.

In operation 6011, the network device sends a third message to the terminal device.

In operation 6012, the terminal device sends a fourth message to the network device.

The third message includes at least one of following configuration parameters.

First configuration parameter: indication information indicating whether the network device supports a passive communication mode function.

Second configuration parameter: threshold requirement information for the terminal device to enter the passive communication mode.

Third configuration parameter: indication information indicating whether the network device supports a passive communication sub-mode function Fourth configuration parameter: threshold requirement information for the terminal device to enter a passive communication sub-mode.

The first configuration parameter is mainly used for the network device to notify the terminal device whether the network device side has an ability of supporting the passive communication mode. The third configuration parameter is mainly used for the network device to notify the terminal device whether the network device side has the ability of supporting the passive communication sub-mode.

In an optional embodiment of the present disclosure, if the network device is a core network device, the core network device may notify the terminal device of ability indication information associated with whether the core network device side supports the passive communication mode (or the passive communication sub-mode) through an NAS signaling process.

In an optional embodiment of the present disclosure, if the network device is an access network device, the access network device may notify the terminal device of ability indication information associated with whether the access network device side supports the passive communication mode (or the passive communication sub-mode) through an AS signaling process. The AS signaling is a system broadcast message, a system multicast message, an RRC dedicated signaling, a PHY layer message or an MAC control message.

In an optional embodiment of the present disclosure, if the third message includes the second configuration parameter, which means that even if the first configuration parameter indicates that the network device side has the ability of supporting the passive communication mode, and/or the terminal device has received the configuration information associated with the passive communication mode contained in the first message, the terminal device may enter the passive communication mode only when the threshold requirement corresponding to the second configuration parameter is satisfied, instead of entering the passive communication mode immediately.

Exemplarily, the threshold requirement may be a threshold requirement associated with cell measurement. For example, the terminal device may enter the passive communication mode when a measurement result of the serving cell is greater than a threshold or less than a threshold. Exemplarily, the threshold requirement may also be a threshold requirement of a timer, for example, the terminal device may enter the passive communication mode when the timer exceeds a timer threshold.

In an optional embodiment of the present disclosure, if a passive communication mode has multiple passive communication sub-modes, the network device needs a separate indication bit to respectively indicate a supporting situation for each of the multiple passive communication sub-mode, so that the terminal device may know the passive communication sub-modes supported by the network device and the passive communication sub-modes not supported by the network device.

In an optional embodiment of the present disclosure, if the third message includes the fourth configuration parameter, which means that even if the third configuration parameter indicates that the network device side has the ability associated with supporting the passive communication sub-mode, and/or the terminal device has received the configuration information associated with the passive communication sub-mode contained in the first message, the terminal device may enter the passive communication sub-mode only when the threshold requirement corresponding to the fourth configuration parameter satisfies the condition, instead of entering the passive communication sub-mode immediately. The related thresholds in the fourth configuration parameter may be configured according to the granularity of passive communication sub-modes, i.e., one passive communication sub-mode is associated with a set of threshold configurations, which is similar to the related threshold configurations in the second configuration parameter. Specific examples refer to the example description of the second configuration parameter and will not be elaborated herein again.

In the embodiment, the third message mainly indicates a downlink ability of the network device. The third message may be an NAS message or an AS message. The AS message may be a system broadcast message, a system multicast message, an RRC dedicated signaling, a PHY layer message or an MAC control message.

The fourth message includes at least one of: ability indication information indicating whether the terminal device supports a passive communication mode function or ability indication information indicating whether the terminal device supports a passive communication sub-mode function.

Unlike the third message, the fourth message is an uplink message sent by the terminal device to the network device. The terminal device needs to inform the network device, through the fourth message, of the ability information of whether the terminal device itself supports the passive communication mode function and/or the ability information of whether the terminal device itself supports the passive communication sub-mode function. If one the passive communication mode has multiple passive communication sub-modes, the terminal device needs to respectively indicate an ability associated with each of the multiple passive communication sub-modes to the network device, so that the network device may know the passive communication sub-modes supported by the terminal device and the passive communication sub-modes not supported by the terminal device.

In the embodiment, the fourth message mainly indicates an uplink ability of the terminal device. The fourth message may be an NAS message or an AS message. The AS message may be a system broadcast message, a system multicast message, an RRC dedicated signaling, a PHY layer message or an MAC control message.

It should be noted that the execution sequence of the operations 6011 and 6012 is not limited in the embodiment, and the operation 6012 may be performed before the operation 6011.

In the operation 602, the network device sends a first message to the terminal device. The first message at least includes first configuration information for notifying the terminal device to enter the passive communication mode.

The embodiment provides a method for controlling a terminal device. Indication information associated with the passive communication mode is interacted between the terminal device and the network device, so that both the terminal device and the network device know the ability associated with the passive communication mode of each other. In such way, the network device sends the first message to the terminal device, and the first message at least includes the first configuration information for notifying the terminal device to enter the passive communication mode. The terminal device may communicate with the network device by adopting the passive communication mode according to the first message. According to the above process, the power consumption of terminal device can be reduced, and the purpose of energy saving can be achieved.

Optionally, in some embodiments, the operation 602 may also be performed before the operation 601.

Figure 7:
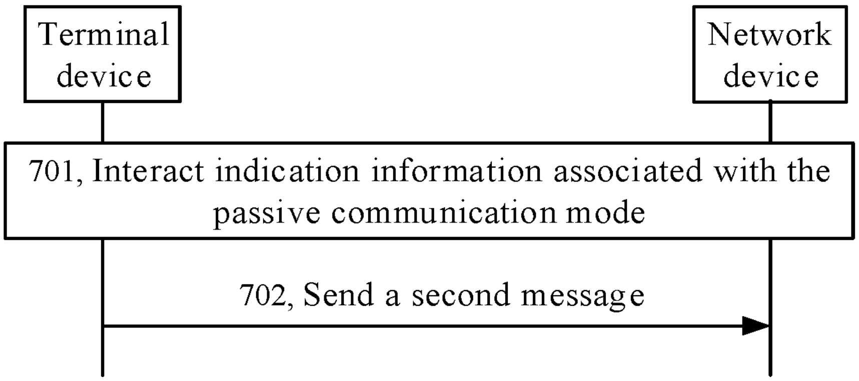
FIG. 7 is a fifth schematic diagram of interaction in a method for controlling a terminal device according to an embodiment of the present disclosure.

FIG. 7 is a fifth schematic diagram of interaction in a method for controlling a terminal device according to an embodiment of the present disclosure. Based on the embodiment illustrated in FIG. 4, as illustrated in FIG. 7, the method for controlling the terminal device provided by the embodiment includes operations 701 to 702.

In the operation 701, indication information associated with a passive communication mode is interacted between a network device and a terminal device.

The operation may be referenced to the operation 601 in the above embodiment in detail and will not be elaborated herein again.

In the operation 702, the terminal device sends a second message to the network device. The second message is used for requesting for entering or exiting the passive communication mode, or requesting for modifying configuration information associated with the passive communication mode.

The embodiment provides a method for controlling a terminal device. The indication information associated with the passive communication mode is interacted between the terminal device and the network device, so that the terminal device and the network device know the ability and/or threshold requirement associated with the passive communication mode of each other. In such way, the terminal device actively initiates the request for entering or exiting the passive communication mode according to its own situation, thereby reducing the power consumption of the terminal device and achieving the purpose of energy saving.

Optionally, in some embodiments, the terminal device sends a second message to the network device, and when the second message is used for requesting for entering the passive communication mode, the communication may also be performed through following operations.

The terminal device receives the first message from the network device. The first message at least includes first configuration information for notifying the terminal device to enter the passive communication mode. The terminal device may communicate with the network device according to requirements of the passive communication mode. In the embodiment, the terminal device actively initiates to enter the passive communication mode, and may communicate with the network device by adopting the passive communication mode only after receiving the response message, i.e. the first message, from the network device.

Optionally, in some embodiments, operation 702 may also be performed before the operation 701.

Figure 8:
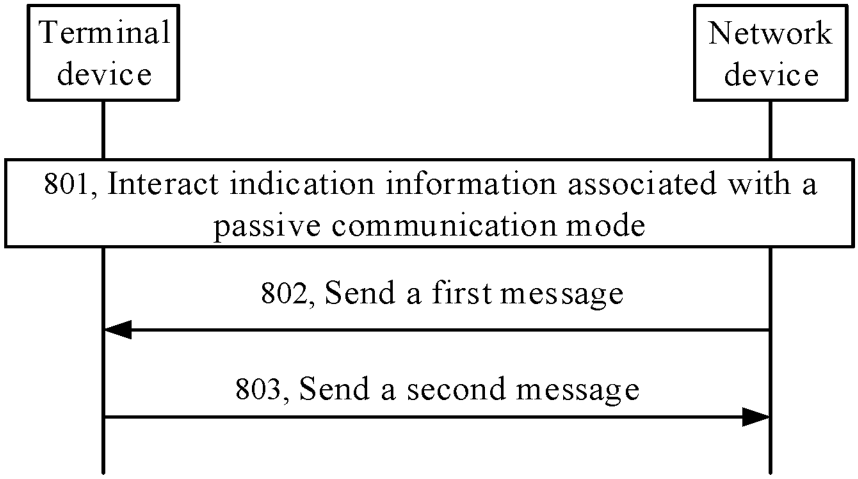
FIG. 8 is a sixth schematic diagram of interaction in a method for controlling a terminal device according to an embodiment of the present disclosure.

FIG. 8 is a sixth schematic diagram of interaction in a method for controlling a terminal device according to an embodiment of the present disclosure. Based on the embodiment illustrated in FIG. 5, as illustrated in FIG. 8, the method for controlling the terminal device provided by the embodiment includes operations 801 to 803.

In the operation 801, indication information associated with a passive communication mode is interacted between a network device and a terminal device.

In the operation 802, the network device sends a first message to the terminal device. The first message at least includes first configuration information for notifying the terminal device to enter the passive communication mode.

In the operation 803, the terminal device sends a second message to the network device. The second message is used for requesting for entering or exiting the passive communication mode, or requesting for modifying configuration information associated with the passive communication mode.

Optionally, in some embodiments, operations 802 and 803 may be performed before the operation 801.

The embodiment provides a method for controlling a terminal device. Indication information associated with the passive communication mode is interacted between the network device and the terminal device, so that the network device and the terminal device know the ability and/or threshold requirement associated with the passive communication mode of each other. In such way, the terminal device receives the first message from the network device, and the terminal device enters the passive communication mode according to the first message. The terminal device then requests for exiting the passive communication mode by sending the second message. Optionally, the terminal device initiates a request for entering the passive communication mode (i.e., sending the second message) to the network device according to the configuration information associated with the passive communication mode in the first message, and then the terminal device enters the passive communication mode after sending the second message or enters the passive communication mode according to the message responded by the network device. Optionally, the terminal device firstly sends a second message to the network device, after the network device consents to the request for entering the passive communication mode initiated by the terminal device, the terminal device receives the first message sent by the network device and enters the passive communication mode according to requirements of the configuration information contained in the first message. The above process can reduce the power consumption of device and achieve the purpose of energy saving.

The above several embodiments are summarized as follows.

Figure 9:
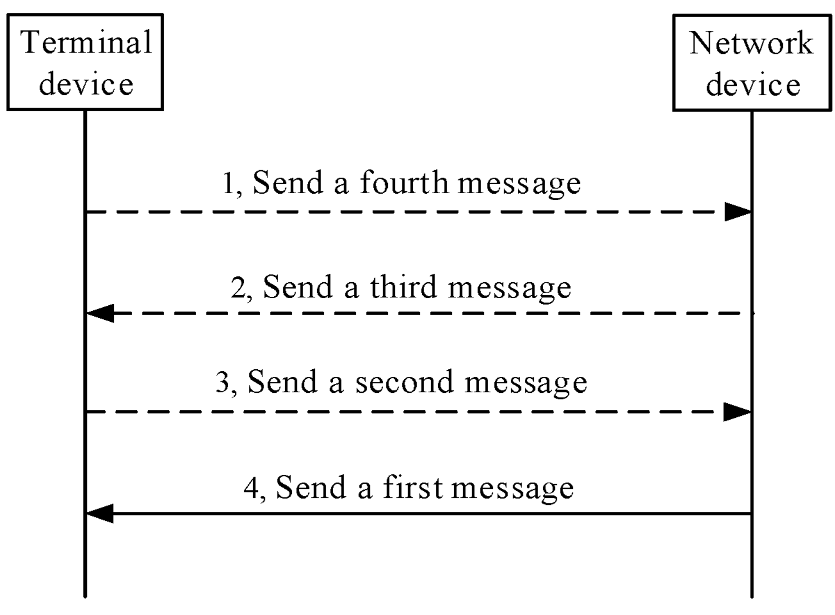
FIG. 9 is a seventh schematic diagram interaction in of a method for controlling a terminal device according to an embodiment of the present disclosure.

FIG. 9 is a seventh schematic diagram of interaction in a method for controlling a terminal device according to an embodiment of the present disclosure. As illustrated in FIG. 9, the method for controlling the terminal device provided by the embodiment includes first to fourth operations.

In the first operation, the terminal device sends a fourth message to the network device.

The fourth message includes: ability indication information indicating whether the terminal device supports a passive communication mode function, and/or ability indication information indicating whether the terminal device supports a passive communication sub-mode function.

In the second operation, the network device sends a third message to the terminal device.

The third message includes: indication information indicating whether the network device supports a passive communication mode function, and/or indication information indicating whether the network device supports a passive communication sub-mode function.

In the third operation, the terminal device sends a second message to the network device.

The second message is used for requesting for entering or exiting the passive communication mode, or requesting for modifying configuration information associated with the passive communication mode.

In the fourth operation, the network device sends a first message to the terminal device.

The first message at least includes first configuration information for notifying the terminal device to enter the passive communication mode.

As illustrated in FIG. 9, the first operation to the third operation are optional and are represented by dotted lines.

The logical sequence of the executions of the first to fourth operations is not limited in the present disclosure. The second operation may be performed before or after the first operation; the first operation and second operation as a whole may be performed before or after the third operation and fourth operation as a whole; and the fourth operation may be performed before or after the third operation, which is not limited in the present disclosure.

Figure 10:
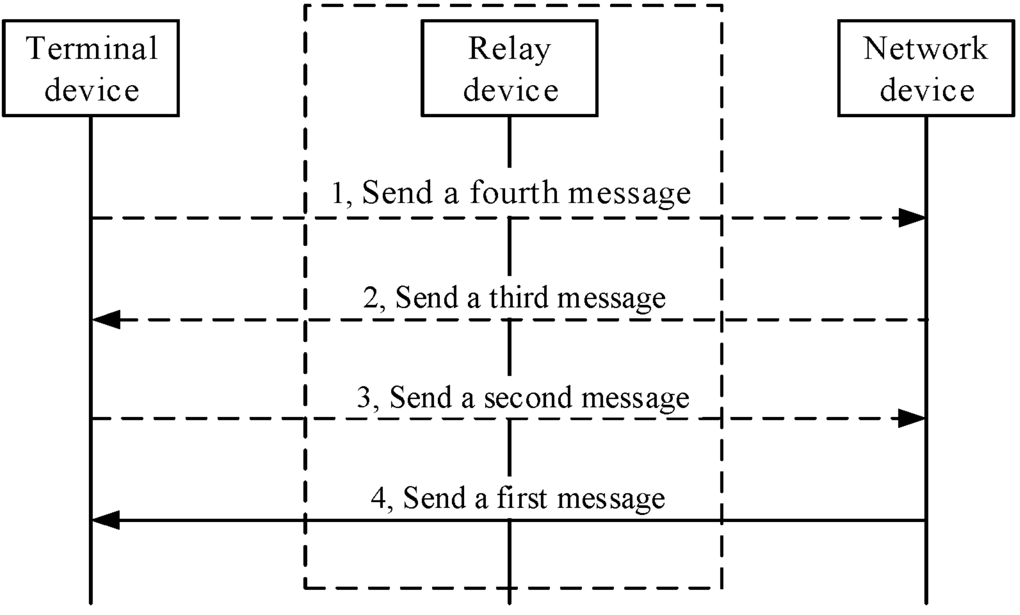
FIG. 10 is an eighth schematic diagram interaction in of a method for controlling a terminal device according to an embodiment of the present disclosure.

FIG. 10 is an eighth schematic diagram of interaction in a method for controlling a terminal device according to an embodiment of the present disclosure. Based on the embodiment illustrated in FIG. 9, as illustrated in FIG. 10, the method for controlling the terminal device provided by the embodiment also involves the interaction between the terminal device and the network device, except that the terminal device sends the second message or the fourth message to the network device through a relay device, and correspondingly, the network device needs to send the first message or the third message to the terminal device through the relay device.

It should be noted that the relay device transmitting messages from the terminal device to the network device may be same as or different from the relay device transmitting messages from the network device to the terminal device, which is not limited in the present disclosure so long as the messages can be transmitted to the opposite device through the relay device.

In the embodiment, the relay device includes a relay terminal device and/or a relay network device.

As can be seen from the above embodiments, the communication between the terminal device and the network device is a direct communication via an air interface or an indirect communication through a relay device, which is not limited in the present disclosure.

The terminal device communicates with the network device via the air interface directly, and the air interface may be a Uu interface, a Wifi interface or a Bluetooth interface.

Alternatively, the terminal device communicates with the network device through the relay device indirectly. The communication interface between the terminal device and the relay terminal device may be a Proximity Communication (PC5) interface, a Wifi interface or a Bluetooth interface. The communication interface between the relay terminal device and the network device may be a Uu interface, a Wifi interface or a Bluetooth interface.

It should be noted that, in the above embodiments, the network device may be an access network device or a core network device.

In order to facilitate the access network device or the core network device to assist the terminal device to activate or deactivate the passive communication mode or to modify the configuration information associated with the passive communication mode of the terminal device, at least one of following information may be interacted between the core network device and the access network device, or between a first access network device and a second access network device.

Ability indication information indicating whether the terminal device supports a passive communication mode function.

Ability indication information indicating whether the terminal device supports a passive communication sub-mode function.

Requesting information for the terminal device to request for activating the passive communication mode or request for activating the passive communication sub-mode.

Requesting information for the terminal device to request for deactivating the passive communication mode or request for deactivating the passive communication sub-mode.

Requesting information for the terminal device to request for modifying the configuration information associated with the passive communication mode.

Cause value information for the network device to reject to activate the passive communication mode or the passive communication sub-mode by the terminal device.

The interfaces involved in the above process include at least one of: an X2 interface, an Xn interface, an S1 interface, an NG interface, an F1 interface or an E1 interface.

The X2 interface is a communication interface between nodes in a fourth generation (4G) wireless access network.

The Xn interface is a communication interface between nodes in a 5G wireless access network.

The S1 interface is a communication interface between a node in the 4G wireless access network and a 4G core network.

The NG interface is a communication interface between a node in the 5G wireless access network and a 5G core network.

The F1 interface is a communication interface between a Central Unit (gNB-CU) and a Distributed Unit (gNB-DU) of nodes in a radio access network using an NR technology.

The E1 interface is a communication interface between a Control Plane in the gNB-CU (gNB-CU-CP) and a User Plane in the gNB-CU (gNB-CU-UP).

Based on the above embodiments, the present disclosure provides a method for controlling a terminal device. On the one hand, the terminal device can flexibly activate or deactivate the passive communication mode, so as to achieve the purpose of energy saving. On the other hand, an application scenario of the 3rd Generation Partnership Project (3GPP) system is also expanded, and the short-range communication terminal device is introduced into the 3GPP system, which is beneficial to realizing the vision of the Internet to Everything in the wireless communication system, and thereby improving the comprehensive experience of users.

The method for controlling the terminal device provided by the embodiments of the present disclosure has been described in detail above, and the terminal device and the network device provided by the embodiments of the present disclosure will be described below.

Figure 11:
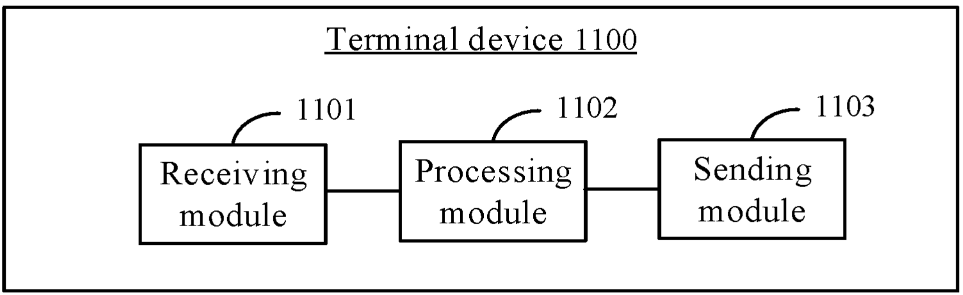
FIG. 11 is a schematic structural diagram of a terminal device according to an embodiment of the present disclosure.

FIG. 11 is a schematic structural diagram of a terminal device according to an embodiment of the present disclosure. As illustrated in FIG. 11, the terminal device provided by the embodiment of the present disclosure includes a receiving module 1101.

The receiving module 1101 is configured to receive a first message from a network device. The first message at least includes first configuration information for notifying the terminal device to enter a passive communication mode.

In an optional embodiment of the present disclosure, the first configuration information includes at least one of following information.

First indication information for instructing the terminal device to enter the passive communication mode.

Resident frequency information indicating information about a frequency to be monitored by the terminal device after the terminal device enters the passive communication mode.

Configuration information of a synchronization signal window corresponding to a resident frequency. The configuration information of the synchronization signal window indicates time position information of a synchronization signal corresponding to the frequency to be monitored by the terminal device after the terminal device enters the passive communication mode.

Subcarrier spacing information corresponding to the resident frequency.

Synchronization period information indicating at least how often downlink signal synchronization is required after the terminal device enters the passive communication mode.

Configuration information of a special paging period.

Temporary identifier information of the terminal device. The temporary identifier information is used for determining whether the terminal device itself is paged when the terminal device monitors paging after entering the passive communication mode.

Security configuration information for performing security verification when the terminal device communicates with the network device.

Configuration information of a waiting duration for activating the passive communication mode. The configuration information of the waiting duration for activating the passive communication mode indicates a duration from a time when the terminal device receives the first configuration information to a time when the terminal device enters the passive communication mode, or indicates a duration from a time when the terminal device enters an RRC idle state to the time when the terminal device enters the passive communication mode, or indicates a duration from a time when the terminal device enters an RRC inactive state to the time when the terminal device enters the passive communication mode.

Level identification information of the passive communication mode. The level identification information indicates a passive communication sub-mode, and each passive communication sub-mode corresponds to a respective predefined task of the terminal device.

Configuration information of an event for the terminal device to exit the passive communication mode.

Indication information of waiting for activating the passive communication mod. The indication information of waiting for activating the passive communication mode indicates that the terminal device, after receiving the first message, stores configuration information contained in the first message and waits for a further activation indication message from the network device, instead of entering the passive communication mode immediately.

In an optional embodiment of the present disclosure, the event for exiting the passive communication mode includes at least one of following events.

A timer T1 corresponding to configuration information of a duration of the passive communication mode is expired. The configuration information of the duration indicates a duration in which the terminal device remains in the passive communication mode after the terminal device enters the passive communication mode.

A periodic timer T2 corresponding to configuration information of a periodic activation window of the passive communication mode is expired. The configuration information of the periodic activation window is used for periodically activating the passive communication mode by the terminal device.

The passive communication mode operates up to a UTC. The UTC indicates a moment up to which the terminal device remains in the passive communication mode after entering the passive communication mode.

A measurement result of a serving cell for the terminal device is lower than a first threshold.

The measurement result of the serving cell is lower than a second threshold for a first duration.

A distance between the terminal device and a position of a reference point is greater than a third threshold.

The distance between the terminal device and the position of the reference point is greater than a fourth threshold for a second duration.

In an optional embodiment of the present disclosure, the configuration information of the event for exiting the passive communication mode includes at least one of: an identifier of at least one event for exiting the passive communication mode, or a configuration parameter corresponding to each of the at least one event for exiting the passive communication mode.

In an optional embodiment of the present disclosure, one or more of the position of the reference point, the T1, the T2, the UTC, the first threshold, the second threshold, the third threshold, the fourth threshold, the first duration or the second duration are configured by at least one of manners.

An NAS message, an AS message, or a default value.

In an optional embodiment of the present disclosure, the terminal device 1100 further includes a processing module 1102.

The processing module 1102 is specifically configured to notify an NAS of the terminal device to enter the passive communication mode at an AS of the terminal device after the terminal device enters the passive communication mode.

Optionally, the processing module 1102 is specifically configured to notify the AS of the terminal device to enter the passive communication mode at the NAS of the terminal device after the terminal device enters the passive communication mode.

In an optional embodiment of the present disclosure, the processing module 1102 is further configured to exit the passive communication mode when a preset condition is satisfied after the terminal device enters the passive communication mode. The preset condition includes at least one of following events.

The event for exiting the passive communication mode is triggered.

Second indication information is received from the network device. The second indication information instructs the terminal device to exit the passive communication mode.

A lower layer of the terminal device receives third indication information from an upper layer of the terminal device. The third indication information instructs the lower layer of the terminal device to exit the passive communication mode.

The upper layer of the terminal device receives fourth indication information from the lower layer of the terminal device. The fourth indication information instructs the upper layer of the terminal device to exit the passive communication mode.

The terminal device is ready to initiate an emergency service.

In an optional embodiment of the present disclosure, the second indication information is carried in the NAS message or the AS message.

In an optional embodiment of the present disclosure, after the terminal device exits the passive communication mode, the processing module 1102 is further configured to:

notify an NAS of the terminal device to exit the passive communication mode at an AS of the terminal device; or notify the AS of the terminal device to exit the passive communication mode at the NAS of the terminal device.

In an optional embodiment of the present disclosure, the terminal device 1100 further includes a sending module 1103.

The sending module 1103 is configured to send a second message to the network device. The second message is used for requesting for entering or exiting the passive communication mode, or requesting for modifying configuration information associated with the passive communication mode.

In an optional embodiment of the present disclosure, the second message includes at least one of following configuration information.

Indication information for requesting for entering the passive communication mode.

Indication information for requesting for exiting the passive communication mode.

A duration in which the terminal device expects to remain in the passive communication mode after entering the passive communication mode.

Configuration information of a special paging period expected by the terminal device.

Temporary identifier assistance information of the terminal device, for assisting the network device to generate a temporary identifier of the terminal device.

Configuration information of a waiting duration for activating the passive communication mode expected by the terminal device. The waiting duration indicates a waiting duration required by the terminal device from preparing to enter the passive communication mode to actually entering the passive communication mode.

Level identification information of the passive communication mode expected by the terminal device. The level identification information represents a passive communication sub-mode, and each passive communication sub-mode corresponds to a respective predefined task of the terminal device.

In an optional embodiment of the present disclosure, the receiving module 1101 is further configured to receive a third message from the network device. The third message includes at least one of the following information.

Indication information indicating whether the network device supports a passive communication mode function.

Threshold requirement information for the terminal device to enter the passive communication mode.

Indication information indicating whether the network device supports a passive communication sub-mode function.

Threshold requirement information for the terminal device to enter a passive communication sub-mode.

In an optional embodiment of the present disclosure, the sending module 1103 is further configured to send a fourth message to the network device. The fourth message includes at least one of: ability indication information indicating whether the terminal device supports a passive communication mode function or ability indication information indicating whether the terminal device supports a passive communication sub-mode function.

In an optional embodiment of the present disclosure, each of the first message, the second message, the third message, and the fourth message is carried in an NAS message or an AS message.

In an optional embodiment of the present disclosure, the passive communication mode or the passive communication sub-mode has at least one of following characteristics.

The terminal device does not actively initiate a link set up process driven by a mobile originated (MO) signaling or MO data before exiting the passive communication mode.

The terminal device is in a low power consumption state, an ultra-low power consumption state or a zero power consumption state.

The terminal device does not perform any task other than a predefined task, corresponding to the passive communication mode, of the terminal device or a predefined task, corresponding to the passive communication sub-mode, of terminal device.

In response to the terminal device being in the passive communication mode and being ready to initiate an emergency service, the terminal device temporarily ignores a communication restriction of the passive communication mode or directly exits the passive communication mode, and then initiates the emergency service.

In an optional embodiment of the present disclosure, the predefined task, corresponding to the passive communication mode, of the terminal device or the predefined task, corresponding to the passive communication sub-mode, of the terminal device includes at least one of following tasks.

A paging monitoring task, a synchronization task, a positioning task, a system information acquisition task, a system information update task, a measurement task, a cell selection/reselection task or a network selection task.

In an optional embodiment of the present disclosure, the terminal device communicates with the network device directly via an air interface, or communicates with the network device indirectly through a relay device.

The terminal device provided by the embodiment of the present disclosure is configured for perform the technical solution performed by the terminal device in any of the aforementioned method embodiments, and the implementation principle and technical effect of the terminal device provided by the embodiment of the present disclosure are similar to that of the aforementioned method, which will not be elaborated herein again.

Figure 12:
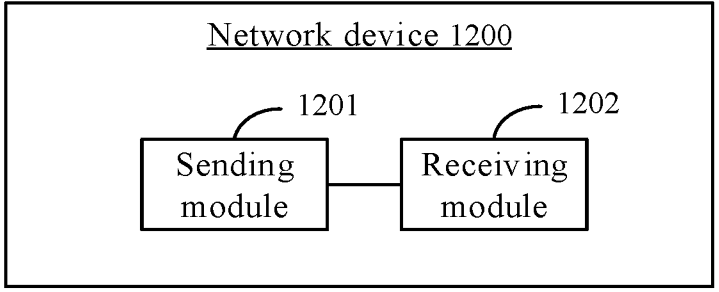
FIG. 12 is a schematic structural diagram of a network device according to an embodiment of the present disclosure.

FIG. 12 is a schematic structural diagram of a network device according to an embodiment of the present disclosure. As illustrated in FIG. 12, the network device provided by the embodiment of the present disclosure includes a sending module 1201.

The sending module 1201 is configured to send a first message to the terminal device. The first message at least includes first configuration information for notifying the terminal device to enter a passive communication mode.

In an optional embodiment of the present disclosure, the first configuration information includes at least one of following information.

First indication information for instructing the terminal device to enter the passive communication mode.

Resident frequency information indicating information about a frequency to be monitored by the terminal device after the terminal device enters the passive communication mode.

Configuration information of a synchronization signal window corresponding to a resident frequency. The configuration information of the synchronization signal window indicates time position information of a synchronization signal corresponding to the frequency to be monitored by the terminal device after the terminal device enters the passive communication mode.

Subcarrier spacing information corresponding to the resident frequency.

Synchronization period information indicating at least how often downlink signal synchronization is required after the terminal device enters the passive communication mode.

Configuration information of a special paging period.

Temporary identifier information of the terminal device. The temporary identifier information is used for determining whether the terminal device itself is paged when the terminal device monitors paging after entering the passive communication mode.

Security configuration information for performing security verification when the terminal device communicates with the network device.

Configuration information of a waiting duration for activating the passive communication mode. The configuration information of the activation waiting duration for activating the passive communication mode indicates a duration from a time when the terminal device receives the first configuration information to a time when the terminal device enters the passive communication mode, or indicates a duration from a time when the terminal device enters an RRC idle state to the time when the terminal device enters the passive communication mode, or indicates a duration from a time when the terminal device enters an RRC inactive state to the time when the terminal device enters the passive communication mode.

Level identification information of the passive communication mode. The level identification information indicates a passive communication sub-mode, and each passive communication sub-mode corresponds to a respective predefined task of the terminal device.

Configuration information of an event for the terminal device to exit the passive communication mode.

Indication information of waiting for activating the passive communication mode. The indication information indicates that the terminal device, after receiving the first message, stores configuration information contained in the first message and waits for a further activation indication message from the network device, instead of entering the passive communication mode immediately.

In an optional embodiment of the present disclosure, the event for exiting the passive communication mode includes at least one of following events.

A timer T1 corresponding to configuration information of a duration of the passive communication mode is expired. The configuration information of the duration indicates a duration in which the terminal device remains in the passive communication mode after entering the passive communication mode.

A periodic timer T2 corresponding to configuration information of a periodic activation window of the passive communication mode is expired. The configuration information of the periodic activation window is used for periodically activating the passive communication mode by the terminal device.

The passive communication mode operates up to a UTC. The UTC indicates a moment up to which the terminal device remains in the passive communication mode after entering the passive communication mode.

A measurement result of a serving cell for the terminal device is lower than a first threshold.

The measurement result of the serving cell is lower than a second threshold for a first duration.

A distance between the terminal device and a position of a reference point is greater than a third threshold.

The distance between the terminal device and the position of the reference point is greater than a fourth threshold for a second duration.

In an optional embodiment of the present disclosure, the configuration information of the event for exiting the passive communication mode includes at least one of: an identifier of at least one event for exiting the passive communication mode, or a configuration parameter corresponding to each of the at least one event for exiting the passive communication mode.

In an optional embodiment of the present disclosure, one or more of the position of the reference point, the T1, the T2, the UTC, the first threshold, the second threshold, the third threshold, the fourth threshold, the first duration or the second duration are configured by at least one of manners.

An NAS message, an AS message, or a default value.

In an optional embodiment of the present disclosure, the sending module 1201 is further configured to send second indication information to the terminal device. The second indication information instructs the terminal device to exit the passive communication mode.

In an optional embodiment of the present disclosure, the second indication information is carried in the NAS message or the AS message.

In an optional embodiment of the present disclosure, the network device 1200 further includes a receiving module 1202.

The receiving module 1202 is configured to receive a second message from the terminal device. The second message is used for requesting for entering or exiting the passive communication mode, or requesting for modifying configuration information associated with the passive communication mode.

In an optional embodiment of the present disclosure, the second message includes at least one of following configuration information.

Indication information for requesting for entering the passive communication mode.

Indication information for requesting for exiting the passive communication mode.

A duration in which the terminal device expects to remain in the passive communication mode after entering the passive communication mode.

Configuration information of a special paging period expected by the terminal device.

Temporary identifier assistance information of the terminal device, for assisting the network device to generate a temporary identifier of the terminal device.

Configuration information of a waiting duration for activating the passive communication mode expected by the terminal device. The waiting duration indicates a waiting duration required by the terminal device from preparing to enter the passive communication mode to actually entering the passive communication mode.

Level identification information of the passive communication mode expected by the terminal device. The level identification information represents a passive communication sub-mode, and each passive communication sub-mode corresponds to a respective predefined task of the terminal device.

In an optional embodiment of the present disclosure, the sending module 1201 is further configured to send a third message to the terminal device. The third message includes at least one of following information.

Indication information indicating whether the network device supports a passive communication mode function.

Threshold requirement information for the terminal device to enter the passive communication mode.

Indication information indicating whether the network device supports a passive communication sub-mode function.

Threshold requirement information for the terminal device to enter a passive communication sub-mode.

In an optional embodiment of the present disclosure, the receiving module 1202 is configured to receive a fourth message from the terminal device. The fourth message includes at least one of: ability indication information indicating whether the terminal device supports a passive communication mode function or ability indication information indicating whether the terminal device supports a passive communication sub-mode function.

In an optional embodiment of the present disclosure, each of the first message, the second message, the third message, and the fourth message is carried in an NAS message or an AS message.

In an optional embodiment of the present disclosure, the passive communication mode or the passive communication sub-mode has at least one of following characteristics.

The terminal device does not actively initiate a link set up process driven by a mobile originated (MO) signaling or MO data before exiting the passive communication mode.

The terminal device is in a low power consumption state, an ultra-low power consumption state or a zero power consumption state.

The terminal device does not perform any task other than a predefined task, corresponding to the passive communication mode, of the terminal device or a predefined task, corresponding to the passive communication sub-mode, of terminal device.

In response to the terminal device being in the passive communication mode and being ready to initiate an emergency service, the terminal device temporarily ignores a communication restriction of the passive communication mode or directly exits the passive communication mode, and then initiates the emergency service.

In an optional embodiment of the present disclosure, the predefined task, corresponding to the passive communication mode, of the terminal device or the predefined task, corresponding to the passive communication sub-mode, of the terminal device includes at least one of following tasks.

A paging monitoring task, a synchronization task, a positioning task, a system information acquisition task, a system information update task, a measurement task, a cell selection/reselection task or a network selection task.

In an optional embodiment of the present disclosure, the terminal device communicates with the network device directly via an air interface, or communicates with the network device indirectly through a relay device.

In an optional embodiment of the present disclosure, the network device is an access network device or a core network device.

The network device provided by the embodiment of the present disclosure is configured to perform the technical schemes performed by the terminal device in any of the aforementioned method embodiments, and the implementation principle and technical effect of the network device provided by the embodiment of the present disclosure are similar to that of the aforementioned method, which will not be elaborated herein again.

It should be noted that the partitioning of the modules of the terminal device or network device is merely logical functional partitioning, the modules may, in practice, be fully or partially integrated into a physical entity or may be physically separated. These modules can all be implemented in the form of software invoked by processing elements, or implemented in the form of hardware. Alternatively, some modules are implemented in the form of software invoked by the processing elements and some modules are implemented in the form of hardware. For example, the processing module may be a processing element arranged separately, or may be integrated in a chip in the device. Optionally, the processing modules may be stored in the memory of the device in the form of program codes, and invoked by a processing element of the device to perform the functions of the processing module. The implementation of other modules is similar to that of the processing modules.

In addition, all or part of these modules can be integrated or implemented independently. The processing element described herein may be an integrated circuit with signal processing capability. In implementation, the operations of the method or the modules may be implemented by integrated logic circuits of hardware in the processor element or by instructions in the form of software.

For example, the above modules may be one or more integrated circuits configured to implement the above methods, such as one or more Application Specific Integrated Circuits (ASICs), or one or more microprocessor or Digital Signal Processors (DSPs), or one or more Field Programmable Gate Arrays (FPGAs), etc. For another example, when one of the above modules is implemented in the form of a processing element invoking the program codes, the processing element may be a general purpose processor, such as a Central Processing Unit (CPU) and other processors that can invoke the program codes. In another example, these modules can be integrated and implemented in the form of a System-On-Chip (SOC).

The above-described embodiments may be fully or partially implemented in the form of software, hardware, firmware or any combination thereof. When implemented in the form of software, the embodiments may be fully or partially implemented in the form of a computer program product. The computer program product includes one or more computer instructions. When computer program instructions are loaded and executed on a computer, the flow or function according to the embodiments of the present disclosure is fully or partially generated. The computer may be a general purpose computer, a dedicated computer, a computer network, or other programmable device. The computer instructions may be stored in a computer-readable storage medium or transmitted from one computer-readable storage medium to another. For example, the computer instructions may be transmitted from a Web site, computer, server, or data center to another Web site, computer, server, or data center in a wired manner (e.g., a coaxial cable, optical fiber, Digital Subscriber Line (DSL)) or a wireless manner (e.g., infrared, wireless, microwave, etc.). The computer-readable storage medium may be any available medium accessible to a computer or a data storage device such as a server, a data center, or the like that contains one or more integrations of available mediums. The available medium may be a magnetic medium (e.g., a floppy disk, hard disk, magnetic tape), an optical medium (e.g., a digital videodisc (DVD)), or a semiconductor medium (e.g., Solid State Disk (SSD)), etc.

Figure 13:
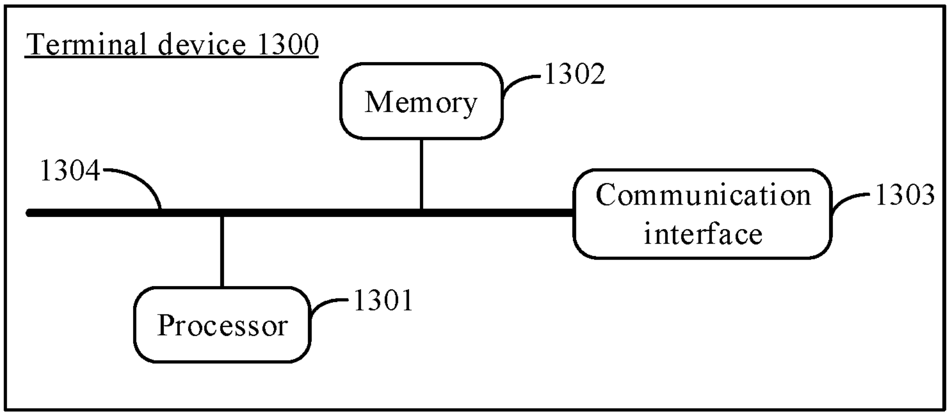
FIG. 13 is a diagram of a hardware structure of a terminal device according to an embodiment of the present disclosure.

FIG. 13 is a diagram of a hardware structure of a terminal device according to an embodiment of the present disclosure. As illustrated in FIG. 13, the terminal device 1300 of the present embodiment includes: a processor 1301, a memory 1302, and a communication interface 1303.

The memory 1302 is configured to store a computer program. The processor 1301 is configured to perform the computer program stored in the memory 1302 to implement the method performed by the terminal device in any of the above method embodiments. The communication interface 1303 is configured to perform data communication or signal communication with a network device or another device.

Optionally, the memory 1302 may be either separated from or integrated with the processor 1301. When the memory 1302 is a device separated from the processor 1301, the terminal device 1300 may further include a bus 1304 configured to connect the memory 1302 and the processor 1301.

The terminal device provided by this embodiment may be configured to perform the method performed by the terminal device in any of the aforementioned method embodiments, and the implementation principle and technical effect of the terminal device provided by this embodiment are similar to that of the method performed by the terminal device in any of the aforementioned method embodiments, which will not be elaborated herein again.

Figure 14:
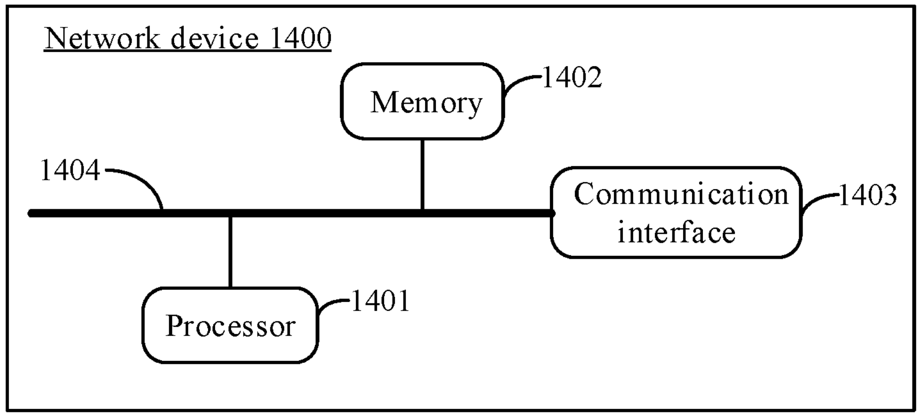
FIG. 14 is a diagram of a hardware structure of a network device according to an embodiment of the present disclosure.

FIG. 14 is a diagram of a hardware structure of a network device according to an embodiment of the present disclosure. As illustrated in FIG. 14, the network device 1400 in the embodiment includes: a processor 1401, a memory 1402, and a communication interface 1403.

The memory 1402 is configured to store a computer program. The processor 1401 is configured to perform the computer program stored in the memory 1402 to implement the method performed by the terminal device in any of the above method embodiments. The communication interface 1403 is configured to perform the data communication or signal communication with a network device or another device.

Optionally, the memory 1402 may be either separated from or integrated with the processor 1401. When the memory 1402 is a device separated from the processor 1401, the terminal device 1400 may further include a bus 1404 configured to connect the memory 1402 and the processor 1401.

The network device provided by this embodiment may be configured to perform the method performed by the network device in any of the aforementioned method embodiments, and the implementation principle and technical effect of the network device provided by this embodiment are similar to that of the method performed by the network device in any of the aforementioned method embodiments, which will not be elaborated herein again.

The embodiment of the present disclosure also provides a computer-readable storage medium having stored thereon a computer program thereon that, when being executed by a computer, causes the computer to implement the technical solution performed by the terminal device in any of the above method embodiments.

The embodiment of the present disclosure also provides a computer-readable storage medium having stored thereon a computer program thereon that, when executed by a computer, causes the computer to implement the technical solution performed by the network device in any of the above method embodiments.

The embodiment of the present disclosure also provides a program which, when being executed by a processor, causes the processor to perform the technical solution performed by the terminal device in any of the method embodiments.

The embodiment of the present disclosure also provides a program which, when being executed by a processor, causes the processor to perform the technical solution performed by the network device in any of the method embodiments.

The embodiment of the present disclosure also provides a computer program product including program instructions for implementing the technical solution performed by the terminal device in any of the above method embodiments.

The embodiment of the present disclosure also provides a computer program product including program instructions for implementing the technical solution performed by the network device in any of the above method embodiments.

The embodiment of the present disclosure also provides a chip including a processing module and a communication interface. The processing module is configured to perform the technical solution performed by the terminal device in any of the method embodiments.

In addition, the chip further includes a memory module (e.g., a memory) configured to store instructions, and the processing module is configured to execute the instructions stored in the memory module, to perform the technical solution performed by the terminal device in any of the foregoing method embodiments.

The embodiment of the present disclosure also provides a chip including a processing module and a communication interface. The processing module is configured to perform the technical solution performed by the network device in any of the method embodiments.

In addition, the chip further includes a memory module (e.g., a memory) configured to store instructions, and the processing module is configured to execute the instructions stored in the memory module, to perform the technical solution performed by the network device in any of the foregoing method embodiments.

The method for controlling the terminal device includes that the terminal device receives a first message from a network device. The first message at least includes first configuration information for notifying the terminal device to enter the passive communication mode, and the terminal device may communicate with the network device according to requirements of the passive communication mode. The terminal device enters the passive communication mode through configuration of a network side, which can reduce the power consumption of the device and achieve the purpose of energy saving.

In the present disclosure, the term "at least two" means two or multiple, and "multiple" means two or more. The term "and/or" is intended to describe an association relationship between associated objects and may represent three relationships. For example, A and/or B may represent three conditions: i.e., only A existing, both A and B existing, and only B existing. A and B may be singular or plural. The character "I" generally indicates that the associated objects before and after this character are in an "or" relationship. In a formula, the character "I" indicates that the related objects are in a "division" relationship. The term "at least one of the followings" or similar expression indicates any combination of the listed items, including any combination of multiple single items or plural items. For example, at least one of a, b, or c may represent: a, b, c, a-b, a-c, b-c, or a-b-c, where a, b, c may be single or multiple.

It should be understood that the various numerical numbers in the embodiments of the present disclosure are only for the convenience of distinguishing and are not intended to limit the scope of the embodiments of the present disclosure.

It should be understood that in the embodiments of the present disclosure, the size of the sequence numbers of the above implementation processes does not imply an implementation order, and the implementation order of various processes should be determined by the functions and inherent logics of the processes. The sequence numbers of the above implementation processes should not constitute any limitation of the implementation processes of the embodiments of the present disclosure.

The invention claimed is:

1. A method for controlling a terminal device in a cellular communication system, comprising:

receiving, by the terminal device, a first message from a network device, wherein the first message at least comprises first configuration information for notifying the terminal device to enter a passive communication mode, and the network device is an access network device or a core network device, wherein the first configuration information comprises at least one of:

first indication information for instructing the terminal device to enter the passive communication mode;

resident frequency information indicating information about a frequency to be monitored by the terminal device after the terminal device enters the passive communication mode;

configuration information of a synchronization signal window corresponding to a resident frequency, wherein the configuration information of the synchronization signal window indicates time position information of a synchronization signal corresponding to the frequency to be monitored by the terminal device after the terminal device enters the passive communication mode;

subcarrier spacing information corresponding to the resident frequency;

synchronization period information indicating at least how often downlink signal synchronization is required after the terminal device enters the passive communication mode;

configuration information of a special paging period;

temporary identifier information of the terminal device, wherein the temporary identifier information is used for determining whether the terminal device itself is paged when the terminal device monitors paging after entering the passive communication mode;

security configuration information for performing security verification when the terminal device communicates with the network device;

configuration information of a waiting duration for activating the passive communication mode, wherein the configuration information of the waiting duration for activating the passive communication mode indicates a duration from a time when the terminal device receives the first configuration information to a time when the terminal device enters the passive communication mode, or indicates a duration from a time when the terminal device enters a radio resource control (RRC) idle state to the time when the terminal device enters the passive communication mode, or indicates a duration from a time when the terminal device enters an RRC inactive state to the time when the terminal device enters the passive communication mode;

level identification information of the passive communication mode, wherein the level identification information indicates a passive communication sub-mode, and each passive communication sub-mode corresponds to a respective predefined task of the terminal device;

configuration information of an event for the terminal device to exit the passive communication mode; or indication information of waiting for activating the passive communication mode, wherein the indication information of waiting for activating the passive communication mode indicates that the terminal device, after receiving the first message, stores configuration information contained in the first message and waits for a further activation indication message from the network device, instead of entering the passive communication mode immediately.

2. The method of claim 1, wherein when the first configuration information comprises the configuration information of the event for the terminal device to exit the passive communication mode, the event for exiting the passive communication mode comprises at least one of:

a timer T1 corresponding to configuration information of a duration of the passive communication mode being expired, wherein the configuration information of the duration indicates a duration in which the terminal device remains in the passive communication mode after entering the passive communication mode;

a periodic timer T2 corresponding to configuration information of a periodic activation window of the passive communication mode being expired, wherein the configuration information of the periodic activation window is used for periodically activating the passive communication mode by the terminal device;

the passive communication mode operating up to a configured Coordinated Universal Time (UTC), wherein the UTC indicates a moment up to which the terminal device remains in the passive communication mode after entering the passive communication mode;

a measurement result of a serving cell for the terminal device being lower than a first threshold;

the measurement result of the serving cell being lower than a second threshold for a first duration;

a distance between the terminal device and a position of a reference point being greater than a third threshold; or the distance between the terminal device and the position of the reference point being greater than a fourth threshold for a second duration.

3. The method of claim 1, wherein when the first configuration information comprises the configuration information of the event for the terminal device to exit the passive communication mode, the configuration information of the event for exiting the passive communication mode comprises at least one of: an identifier of at least one event for exiting the passive communication mode, or a configuration parameter corresponding to each of the at least one event for exiting the passive communication mode.

4. The method of claim 1, further comprising: after the terminal device enters the passive communication mode, notifying, by an access stratum (AS) of the terminal device, a non-access stratum (NAS) of the terminal device to enter the passive communication mode; or notifying, by the NAS of the terminal device, the AS of the terminal device to enter the passive communication mode.

5. The method of claim 1, further comprising: after the terminal device enters the passive communication mode, exiting the passive communication mode when a preset condition is satisfied, wherein the preset condition comprises at least one of:

the event for exiting the passive communication mode being triggered;

receiving second indication information from the network device, wherein the second indication information instructs the terminal device to exit the passive communication mode;

a lower layer of the terminal device receiving third indication information from an upper layer of the terminal device, wherein the third indication information instructs the lower layer of the terminal device to exit the passive communication mode;

the upper layer of the terminal device receiving fourth indication information from the lower layer of the terminal device, wherein the fourth indication information instructs the upper layer of the terminal device to exit the passive communication mode; or the terminal device being ready to initiate an emergency service.

6. The method of claim 5, further comprising: after the terminal device exits the passive communication mode, notifying, by an AS of the terminal device, an NAS of the terminal device to exit the passive communication mode; or notifying, by the NAS of the terminal device, the AS of the terminal device to exit the passive communication mode.

7. The method of claim 1, further comprising:

sending, by the terminal device, a second message to the network device, wherein the second message is used for requesting for entering or exiting the passive communication mode, or requesting for modifying configuration information associated with the passive communication mode, wherein the second message comprises at least one of following configuration information:

indication information for requesting for entering the passive communication mode;

indication information for requesting for exiting the passive communication mode;

a duration in which the terminal device expects to remain in the passive communication mode after entering the passive communication mode;

the configuration information of the special paging period expected by the terminal device;

temporary identifier assistance information of the terminal device, for assisting the network device to generate a temporary identifier of the terminal device;

the configuration information of the waiting duration for activating the passive communication mode expected by the terminal device, wherein the waiting duration indicates a waiting duration required by the terminal device from preparing to enter the passive communication mode to actually entering the passive communication mode; or the level identification information of the passive communication mode expected by the terminal device, wherein the level identification information represents the passive communication sub-mode.

8. The method of claim 1, further comprising:

receiving a third message from the network device, wherein the third message comprises at least one of:

indication information indicating whether the network device supports a passive communication mode function;

threshold requirement information for the terminal device to enter the passive communication mode;

indication information indicating whether the network device supports a passive communication sub-mode function; or threshold requirement information for the terminal device to enter the passive communication sub-mode.

9. The method of claim 1, further comprising:

sending, by the terminal device, a fourth message to the network device, wherein the fourth message comprises at least one of: ability indication information indicating whether the terminal device supports a passive communication mode function or ability indication information indicating whether the terminal device supports a passive communication sub-mode function.

10. The method of claim 1, wherein the passive communication mode or the passive communication sub-mode has at least one of following characteristics:

the terminal device does not actively initiate a link set up process driven by a mobile originated (MO) signaling or MO data before exiting the passive communication mode;

the terminal device is in a low power consumption state, an ultra-low power consumption state or a zero power consumption state;

the terminal device does not perform any task other than a predefined task, corresponding to the passive communication mode, of the terminal device or the predefined task, corresponding to the passive communication sub-mode, of terminal device;

in response to the terminal device being in the passive communication mode and being ready to initiate an emergency service, the terminal device temporarily ignores a communication restriction of the passive communication mode or directly exits the passive communication mode, and then initiates the emergency service.

11. The method of claim 10, wherein the predefined task, corresponding to the passive communication mode, of the terminal device or the predefined task, corresponding to the passive communication sub-mode, of the terminal device comprises at least one of:

a paging monitoring task, a synchronization task, a positioning task, a system information acquisition task, a system information update task, a measurement task, a cell selection/reselection task or a network selection task.

12. A method for controlling a terminal device in a cellular communication system, comprising:

sending, by a network device, a first message to the terminal device, wherein the first message at least comprises first configuration information for notifying the terminal device to enter a passive communication mode, and the network device is an access network device or a core network device, wherein the first configuration information comprises at least one of:

first indication information for instructing the terminal device to enter the passive communication mode;

resident frequency information indicating information about a frequency to be monitored by the terminal device after the terminal device enters the passive communication mode;

configuration information of a synchronization signal window corresponding to a resident frequency, wherein the configuration information of the synchronization signal window indicates time position information of a synchronization signal corresponding to the frequency to be monitored by the terminal device after the terminal device enters the passive communication mode;

subcarrier spacing information corresponding to the resident frequency;

synchronization period information indicating at least how often downlink signal synchronization is required after the terminal device enters the passive communication mode;

configuration information of a special paging period;

temporary identifier information of the terminal device, wherein the temporary identifier information is used for determining whether the terminal device itself is paged when the terminal device monitors paging after entering the passive communication mode;

security configuration information for performing security verification when the terminal device communicates with the network device;

configuration information of a waiting duration for activating the passive communication mode, wherein the configuration information of the waiting duration for activating the passive communication mode indicates a duration from a time when the terminal device receives the first configuration information to a time when the terminal device enters the passive communication mode, or indicates a duration from a time when the terminal device enters a radio resource control (RRC) idle state to the time when the terminal device enters the passive communication mode, or indicates a duration from a time when the terminal device enters an RRC inactive state to the time when the terminal device enters the passive communication mode;

level identification information of the passive communication mode, wherein the level identification information indicates a passive communication sub-mode, and each passive communication sub-mode corresponds to a respective predefined task of the terminal device;

configuration information of an event for the terminal device to exit the passive communication mode; or indication information of waiting for activating the passive communication mode, wherein the indication information of waiting for activating the passive communication mode indicates that the terminal device, after receiving the first message, stores configuration information contained in the first message and waits for a further activation indication message from the network device, instead of entering the passive communication mode immediately.

13. The method of claim 12, wherein when the first configuration information comprises the configuration information of the event for the terminal device to exit the passive communication mode, the event for exiting the passive communication mode comprises at least one of:

a timer T1 corresponding to configuration information of a duration of the passive communication mode being expired, wherein the configuration information of the duration indicates a duration in which the terminal device remains in the passive communication mode after entering the passive communication mode;

a periodic timer T2 corresponding to configuration information of a periodic activation window of the passive communication mode being expired, wherein the configuration information of the periodic activation window is used for periodically activating the passive communication mode by the terminal device;

the passive communication mode operating up to a configured Coordinated Universal Time (UTC), wherein the UTC indicates a moment up to which the terminal device remains in the passive communication mode after entering the passive communication mode;

a measurement result of a serving cell for the terminal device being lower than a first threshold;

the measurement result of the serving cell being lower than a second threshold for a first duration;

a distance between the terminal device and a position of a reference point being greater than a third threshold; or the distance between the terminal device and the position of the reference point being greater than a fourth threshold for a second duration.

14. The method of claim 12, further comprising:

sending, by the network device, second indication information to the terminal device, wherein the second indication information instructs the terminal device, that has entered the passive communication mode, to exit the passive communication mode.

15. The method of claim 12, further comprising:

receiving, by the network device, a second message from the terminal device, wherein the second message is used for requesting for entering or exiting the passive communication mode, or requesting for modifying configuration information associated with the passive communication mode, wherein the second message comprises at least one of following configuration information:

indication information for requesting for entering the passive communication mode;

indication information for requesting for exiting the passive communication mode;

a duration in which the terminal device expects to remain in the passive communication mode after entering the passive communication mode;

the configuration information of the special paging period expected by the terminal device;

temporary identifier assistance information of the terminal device, for assisting the network device to generate a temporary identifier of the terminal device;

the configuration information of the waiting duration for activating the passive communication mode expected by the terminal device, wherein the waiting duration indicates a waiting duration required by the terminal device from preparing to enter the passive communication mode to actually entering the passive communication mode; or the level identification information of the passive communication mode expected by the terminal device, wherein the level identification information represents the passive communication sub-mode.

16. The method of claim 12, further comprising:

sending, by the network device, a third message to the terminal device, wherein the third message comprises at least one of:

indication information indicating whether the network device supports a passive communication mode function;

threshold requirement information for the terminal device to enter the passive communication mode;

indication information indicating whether the network device supports a passive communication sub-mode function; or threshold requirement information for the terminal device to enter the passive communication sub-mode.

17. The method of claim 12, further comprising:

receiving, by the network device, a fourth message from the terminal device, wherein the fourth message comprises at least one of: ability indication information indicating whether the terminal device supports a passive communication mode function or ability indication information indicating whether the terminal device supports a passive communication sub-mode function.

18. A terminal device in a cellular communication system, comprising: a memory for storing a computer program, a transceiver, and a processor configured to invoke and run the computer program from the memory to control the transceiver to receive a first message from a network device, wherein the first message at least comprises first configuration information for notifying the terminal device to enter a passive communication mode, and the network device is an access network device or a core network device, wherein the first configuration information comprises at least one of:

first indication information for instructing the terminal device to enter the passive communication mode;

resident frequency information indicating information about a frequency to be monitored by the terminal device after the terminal device enters the passive communication mode;

configuration information of a synchronization signal window corresponding to a resident frequency, wherein the configuration information of the synchronization signal window indicates time position information of a synchronization signal corresponding to the frequency to be monitored by the terminal device after the terminal device enters the passive communication mode;

subcarrier spacing information corresponding to the resident frequency;

synchronization period information indicating at least how often downlink signal synchronization is required after the terminal device enters the passive communication mode;

configuration information of a special paging period;

temporary identifier information of the terminal device, wherein the temporary identifier information is used for determining whether the terminal device itself is paged when the terminal device monitors paging after entering the passive communication mode;

security configuration information for performing security verification when the terminal device communicates with the network device;

configuration information of a waiting duration for activating the passive communication mode, wherein the configuration information of the waiting duration for activating the passive communication mode indicates a duration from a time when the terminal device receives the first configuration information to a time when the terminal device enters the passive communication mode, or indicates a duration from a time when the terminal device enters a radio resource control (RRC) idle state to the time when the terminal device enters the passive communication mode, or indicates a duration from a time when the terminal device enters an RRC inactive state to the time when the terminal device enters the passive communication mode;

level identification information of the passive communication mode, wherein the level identification information indicates a passive communication sub-mode, and each passive communication sub-mode corresponds to a respective predefined task of the terminal device;

configuration information of an event for the terminal device to exit the passive communication mode; or indication information of waiting for activating the passive communication mode, wherein the indication information of waiting for activating the passive communication mode indicates that the terminal device, after receiving the first message, stores configuration information contained in the first message and waits for a further activation indication message from the network device, instead of entering the passive communication mode immediately.

* * * * *